(12) United States Patent
Ikemoto et al.

(10) Patent No.: US 12,476,354 B2
(45) **Date of Patent: *Nov. 18, 2025**

(54) ANTENNA ELEMENT AND ELECTRONIC DEVICE

(71) Applicant: Murata Manufacturing Co., Ltd., Nagaokakyo (JP)

(72) Inventors: Nobuo Ikemoto, Nagaokakyo (JP); Kosuke Nishio, Nagaokakyo (JP); Kaoru Sudo, Nagaokakyo (JP); Keiichi Ichikawa, Nagaokakyo (JP); Nobuyuki Tenno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 123 days.

This patent is subject to a terminal disclaimer.

(21) Appl. No.: 18/382,600

(22) Filed: Oct. 23, 2023

(65) Prior Publication Data

US 2024/0055754 A1 Feb. 15, 2024

Related U.S. Application Data

(63) Continuation of application No. PCT/JP2022/017729, filed on Apr. 13, 2022.

(30) Foreign Application Priority Data

May 7, 2021 (JP) ................................ 2021-079045

(51) Int. Cl.
*H01Q 1/38* (2006.01)
*H01Q 1/40* (2006.01)

(52) U.S. Cl.
CPC ................ *H01Q 1/38* (2013.01); *H01Q 1/40* (2013.01)

(58) Field of Classification Search
CPC ........... H01Q 1/38; H01Q 1/40; H01Q 9/045; H01Q 9/0407; H01Q 9/0442; H01Q 13/10; H01Q 13/106
See application file for complete search history.

(56) References Cited

U.S. PATENT DOCUMENTS 6,034,636 A 3/2000 Saitoh
7,466,269 B2 * 12/2008 Haziza ................ H01Q 9/0442 343/702

(Continued)

FOREIGN PATENT DOCUMENTS

EP 1793451 A1 6/2007
JP 03192804 A 8/1991

(Continued)

OTHER PUBLICATIONS

International Search Report in PCT/JP2022/017729, mailed Jul. 12, 2022, 4 pages.

(Continued)

*Primary Examiner* — Tung X Le
(74) *Attorney, Agent, or Firm* — Keating & Bennett, LLP

(57) ABSTRACT

An antenna element includes an insulative substrate including first and second main surfaces arranged in an up-down direction. At least one antenna conductor layer is provided on the first main surface of the insulative substrate. At least one insulative substrate non-forming region is provided between the insulative substrate and the antenna conductor layer in the up-down direction. An insulator layer does not exist in the at least one insulative substrate non-forming region. When seen in the up-down direction, all of an outer boundary of at least one antenna conductor overlaps the at least one insulative substrate non-forming region and is not (Continued)

in contact with the insulative substrate. At least one of the at least one insulative substrate non-forming region includes a void.

22 Claims, 34 Drawing Sheets

(56) References Cited

U.S. PATENT DOCUMENTS

| | | | | |
|---|---|---|---|---|
| 9,876,278 | B2 * | 1/2018 | Sawa | H01Q 19/005 |
| 11,664,606 | B2 * | 5/2023 | Chen | H01Q 7/005 343/893 |
| 12,126,100 | B2 * | 10/2024 | Shekhar | H01Q 21/065 |
| 2002/0041255 | A1 | 4/2002 | Baba | |
| 2007/0126638 | A1 * | 6/2007 | Channabasappa | H01Q 9/0407 343/700 MS |
| 2008/0042917 | A1 * | 2/2008 | Seki | H01Q 19/195 343/837 |
| 2015/0034825 | A1 | 2/2015 | Debray et al. | |
| 2015/0236425 | A1 * | 8/2015 | Sudo | H01Q 9/42 343/700 MS |
| 2016/0126636 | A1 * | 5/2016 | Uemichi | H01Q 21/0043 343/771 |
| 2019/0115664 | A1 * | 4/2019 | Veihl | H01Q 5/50 |
| 2019/0190142 | A1 * | 6/2019 | Nagaishi | H01Q 1/526 |

FOREIGN PATENT DOCUMENTS

| | | | |
|---|---|---|---|
| JP | 05175719 | A | 7/1993 |
| JP | H1065437 | A | 3/1998 |
| JP | 10190351 | A | 7/1998 |
| JP | 11122032 | A | 4/1999 |
| JP | 2002118417 | A | 4/2002 |
| JP | 2002217637 | A | 8/2002 |
| JP | 2004096259 | A | 3/2004 |
| JP | 2005210672 | A | 8/2005 |
| JP | 2006064679 | A | 3/2006 |
| JP | 2013214939 | A | 10/2013 |
| JP | 2018137737 | A | 8/2018 |
| WO | 2017168705 | A1 | 10/2017 |

OTHER PUBLICATIONS

Written Opinion in PCT/JP2022/017729, mailed Jul. 12, 2022, 5 pages.

* cited by examiner

10a

10m

ANTENNA ELEMENT AND ELECTRONIC DEVICE

CROSS REFERENCE TO RELATED APPLICATIONS

This application claims the benefit of priority to Japanese Patent Application No. 2021-079045 filed on May 7, 2021 and is a Continuation application of PCT Application No. PCT/JP2022/017729 filed on Apr. 13, 2022. The entire contents of each application are hereby incorporated herein by reference.

BACKGROUND OF THE INVENTION

1. Field of the Invention

The present invention relates to an antenna element that includes an antenna conductor layer.

2. Description of the Related Art

As an invention relating to an antenna element of the related art, for example, a microstrip antenna described in Japanese Unexamined Patent Application Publication No. 2004-096259 is known. This microstrip antenna includes a dielectric substrate, a quadrangular conductor, and an earth conductor. The dielectric substrate has an upper main surface and a lower main surface. The quadrangular conductor is provided on the upper main surface of the dielectric substrate. The earth conductor is provided on the lower main surface of the dielectric substrate. The quadrangular conductor overlaps the earth conductor when seen in the up-down direction. In such a microstrip antenna, the quadrangular conductor functions as an antenna.

In the microstrip antenna described in Japanese Unexamined Patent Application Publication No. 2004-096259, an electric field concentration may occur at an outer boundary of the quadrangular conductor when seen in the up-down direction. When such an electric field concentration occurs, for example, electric field coupling of the quadrangular conductor and a conductor existing around the quadrangular conductor is likely to occur. In this case, the electromagnetic wave is likely to be radiated from the quadrangular conductor toward the conductor existing around the quadrangular conductor. As a result, radiation efficiency of the microstrip antenna reduces.

SUMMARY OF THE INVENTION

Preferred embodiments of the present invention provide antenna elements and electronic devices that each reduce or prevent a decrease in radiation efficiency of an antenna element.

An antenna element according to a preferred embodiment of the present invention includes an insulative substrate including a first main surface and a second main surface arranged in an up-down direction, and at least one antenna conductor layer on the first main surface of the insulative substrate. An insulative substrate non-forming region is between the insulative substrate and the antenna conductor layer in the up-down direction. The insulative substrate does not exist in the insulative substrate non-forming region. When seen in the up-down direction, all of an outer boundary of the at least one antenna conductor overlaps the insulative substrate non-forming region and is not in contact with the insulative substrate. The antenna element has a structure in which the at least one insulative substrate non-forming region is a void, or a structure in which a low dielectric constant material having a lower dielectric constant than a dielectric constant of the insulative substrate is provided in the at least one insulative substrate non-forming region.

With the antenna elements and the electronic devices according to preferred embodiments of the present invention, a decrease in the radiation efficiency of the antenna element is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred Embodiments

Structure of Antenna Element

Figure 1:
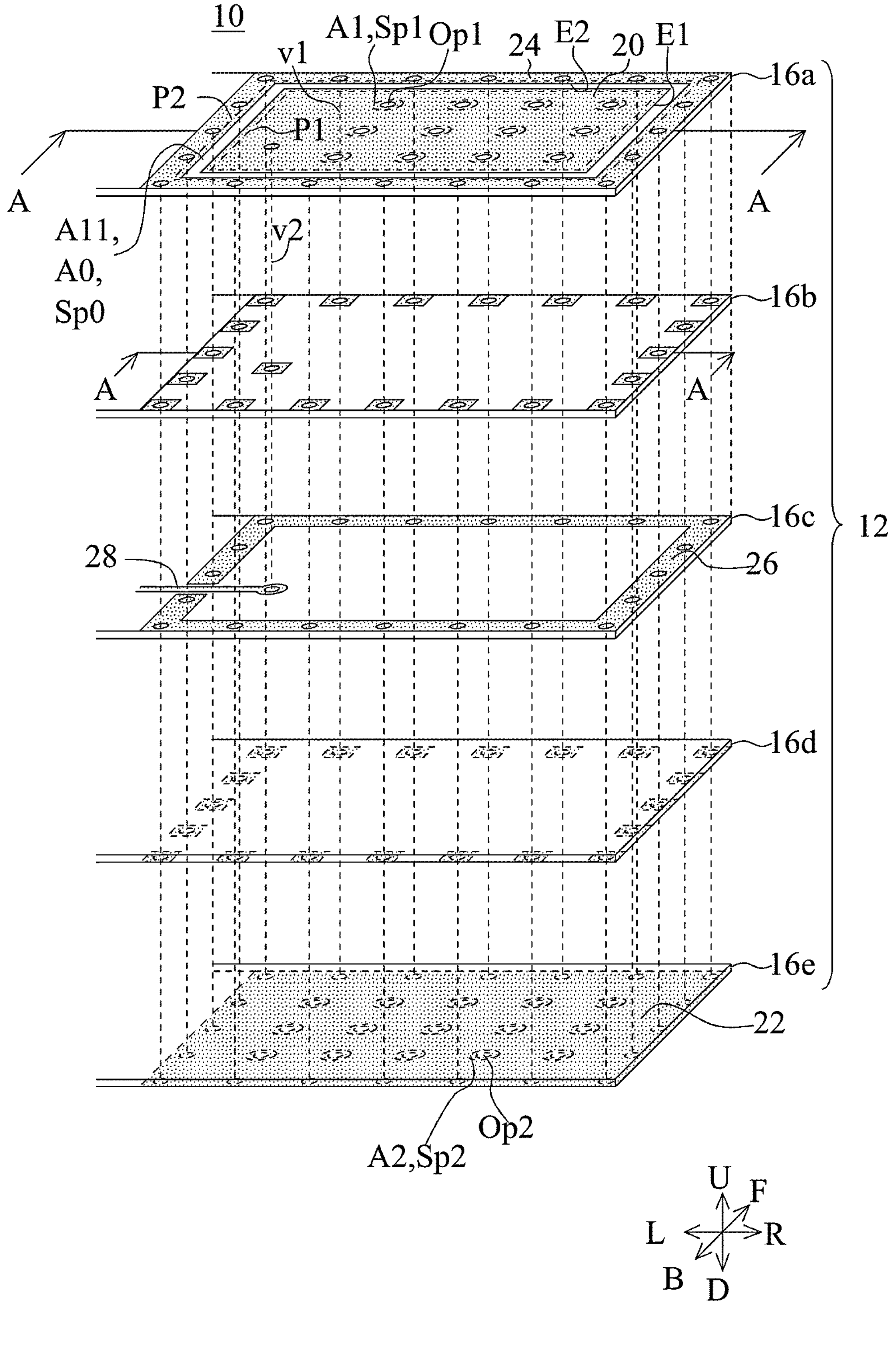
FIG. 1 is an exploded perspective view of an antenna element 10 according to a preferred embodiment of the present invention.
Figure 2:
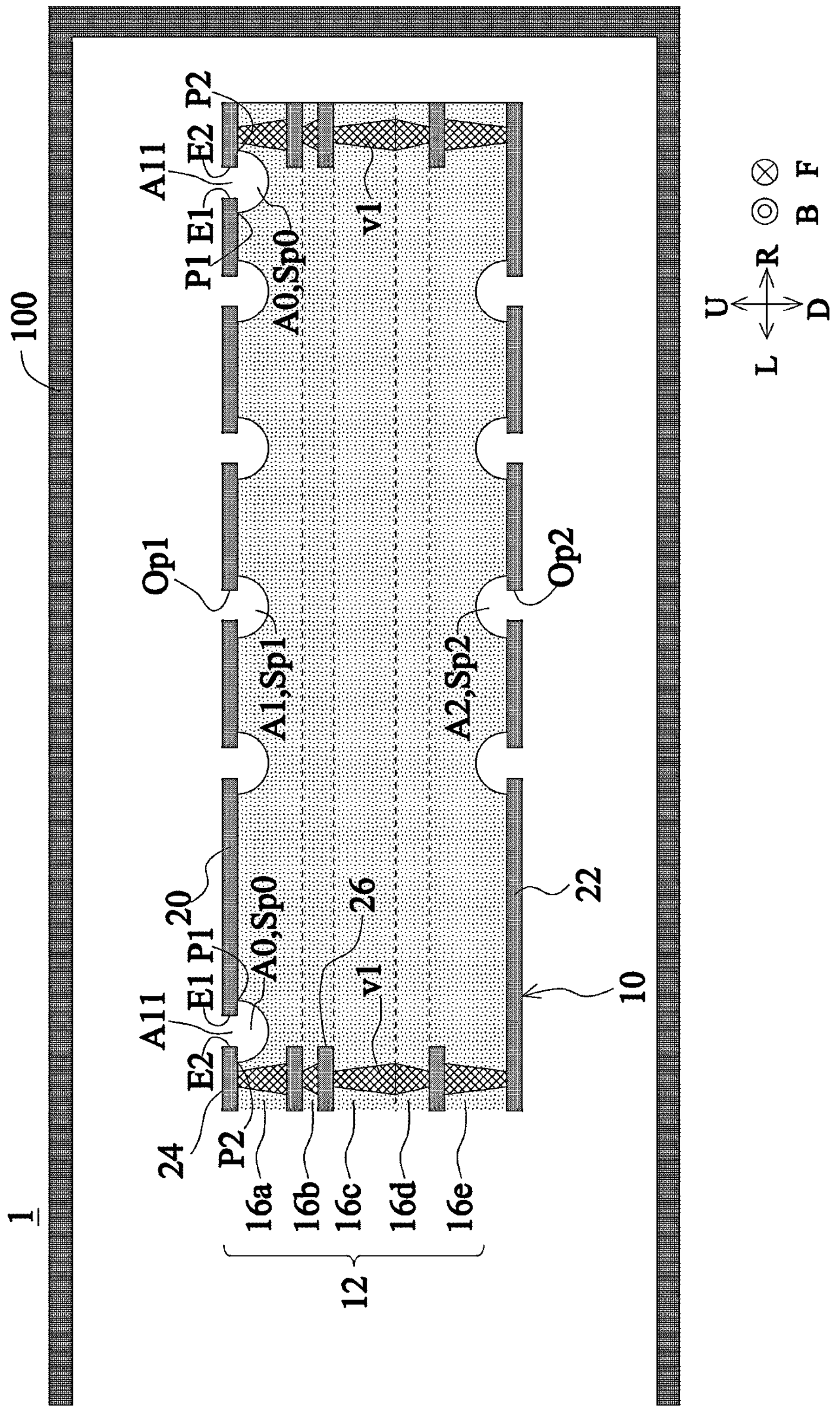
FIG. 2 is a sectional view taken along line A-A of FIG. 1.

Hereinafter, the structures of antenna elements according to preferred embodiments of the present invention are described with reference to the drawings. FIG. 1 is an exploded perspective view of an antenna element 10 according to a preferred embodiment of the present invention. In FIG. 1, only the following components are denoted by the reference numerals. That is, a representative interlayer connection conductor v1, a representative first opening Op1, a representative second opening Op2, a representative first insulative substrate non-forming region A1, a representative second insulative substrate non-forming region A2, a representative first void Sp1, and a representative second void Sp2 out of a plurality of interlayer connection conductors v1, a plurality of first openings Op1, a plurality of second openings Op2, a plurality of first insulative substrate non-forming regions A1, a plurality of second insulative substrate non-forming regions A2, a plurality of first voids Sp1, and a plurality of second voids Sp2. FIG. 2 is a sectional view of an electronic device 1 that includes the antenna element 10. FIG. 2 is a sectional view taken along line A-A of FIG. 1. However, a housing 100 not illustrated in FIG. 1 is illustrated in FIG. 2.

Herein, directions are defined as follows. A direction in which normal lines of an upper main surface and a lower main surface of an insulative substrate 12 of the antenna element 10 extend is defined as an up-down direction. The up-down direction corresponds to a lamination direction of the insulative substrate 12. Furthermore, a direction in which the long side of an antenna conductor layer 20 of the antenna element 10 extends is defined as a left-right direction. A direction in which the narrow side of the antenna conductor layer 20 of the antenna element 10 extends is defined as a front-back direction. The up-down direction is perpendicular or substantially perpendicular to the front-back direction. The left-right direction is perpendicular or substantially perpendicular to the up-down direction and the front-back direction.

Hereinafter, an X is a component or a member of the antenna element 10. Herein, unless otherwise specified, portions of the X are defined as follows. A front portion of an X means a front half of the X. A back portion of an X means a back half of the X. A left portion of an X means a left half of the X. A right portion of an X means a right half of the X. An upper portion of an X means an upper half of the X. A lower portion of an X means a lower half of the X. A front end of an X means an end of the X in the front direction. A back end of an X means an end of the X in the back direction. A left end of an X means an end of the X in the left direction. A right end of an X means an end of the X in the right direction. An upper end of an X means an end of the X in the upper direction. A lower end of an X means an end of the X in the lower direction. A front end portion of an X means the front end of the X and the proximity of the front end of the X. A back end portion of an X means the back end of the X and the proximity of the back end of the X. A left end portion of an X means the left end of the X and the proximity of the left end of the X. A right end portion of an X means the right end of the X and the proximity of the right end of the X. An upper end portion of an X means the upper end of the X and the proximity of the upper end of the X. A lower end portion of an X means the lower end of the X and the proximity of the lower end of the X.

First, the structure of the antenna element 10 is described with reference to FIG. 1. As illustrated in FIG. 1, the antenna element 10 includes the insulative substrate 12, the antenna conductor layer 20, reference conductor layers 22, 24, and 26, a signal conductor layer 28, the plurality of interlayer connection conductors v1, and an interlayer connection conductor v2.

The insulative substrate 12 has a plate shape. Accordingly, the insulative substrate 12 includes the upper main surface (a first main surface) and the lower main surface (a second main surface) arranged in the up-down direction. The upper main surface and the lower main surface of the insulative substrate 12 have a rectangular or substantially rectangular shape having the long side extending in the left-right direction. Accordingly, the length of the insulative substrate 12 in the left-right direction is greater than the length of the insulative substrate 12 in the front-back direction.

As illustrated in FIG. 1, the insulative substrate 12 includes insulator layers 16*a* to 16*e*. The insulative substrate 12 has a structure in which the insulator layers 16*a* to 16*e* are laminated together in the up-down direction. The insulator layers 16*a* to 16*e* are arranged in this order from upper to lower surfaces. When seen in the up-down direction, the insulator layers 16*a* to 16*e* have the same or substantially the same rectangular or substantially rectangular shape as that of the insulative substrate 12. The insulator layers 16*a* to 16*e* are flexible dielectric sheets. The material of the insulative substrate 12 is, for example, thermoplastic resin. Examples of the thermoplastic resin include thermoplastic resins such as, for example, liquid crystal polymer and polytetrafluoroethylene (PTFE) The material of the insulative substrate 12 may be, for example, polyimide. The insulative substrate 12 has flexibility. Thus, the antenna element 10 may be bent in use. The sentence “the antenna element 10 is bent” means that the antenna element 10 is deformed and bent due to application of an external force to the antenna element 10. The deformation may be elastic deformation, plastic deformation, or elastic deformation and plastic deformation.

The antenna conductor layer 20 is provided on the upper main surface or the lower main surface of the insulative substrate 12. According to the present preferred embodiment, the antenna conductor layer 20 is provided on the upper main surface of the insulative substrate 12. The antenna conductor layer 20 is provided on an upper main surface of the insulator layer 16*a* (a first insulator layer). When seen in the up-down direction, the antenna conductor layer 20 has a rectangular or substantially rectangular shape including the long side extending in the left-right direction. The antenna conductor layer 20 resonates at both the narrow side extending in the front-back direction and the long side extending in the left-right direction. Thus, the length of the narrow side extending in the front-back direction of the antenna conductor layer 20 and the length of the long side extending in the left-right direction of the antenna conductor layer 20 are each about half a corresponding one of the wavelengths of radio-frequency signals to be transmitted and received by the antenna conductor layer 20. The length of the wavelength of the radio-frequency signal to be transmitted and received by the antenna conductor layer 20 is a wavelength for which a wavelength shortening effect due to the dielectric constant of the insulative substrate 12 is considered. The antenna conductor layer 20 radiates the radio-frequency signal as an electromagnetic wave. Also, the antenna conductor layer 20 receives the radio-frequency signal of the electromagnetic wave.

The signal conductor layer 28 is provided in the insulative substrate 12. According to the present preferred embodiment, the signal conductor layer 28 is provided on an upper main surface of the insulator layer 16*c*. The signal conductor layer 28 has a linear shape extending in the left-right direction. When seen in the up-down direction, a right end portion of the signal conductor layer 28 overlaps the antenna conductor layer 20. The signal conductor layer 28 transmits the radio-frequency signal.

The interlayer connection conductor v2 electrically connects the antenna conductor layer 20 and the signal conductor layer 28 to each other. In more detail, the interlayer connection conductor v2 extends through the insulator layers 16*a* and 16*b* in the up-down direction. An upper end of the interlayer connection conductor v2 is connected to the antenna conductor layer 20. The position of the antenna conductor layer 20 to which the interlayer connection conductor v2 is connected is a power feeding point of the radio-frequency signal. A lower end of the interlayer connection conductor v2 is connected to the right end portion of the signal conductor layer 28.

The reference conductor layer 22 provided on the insulative substrate 12 is provided below the antenna conductor layer 20. According to the present preferred embodiment, the reference conductor layer 22 is provided on a lower main surface of the insulator layer 16*e*. When seen in the up-down direction, the reference conductor layer 22 overlaps the antenna conductor layer 20. When seen in the up-down direction, the reference conductor layer 22 has a rectangular or substantially rectangular shape including the long side extending in the left-right direction. When seen in the up-down direction, the reference conductor layer 22 extends off the antenna conductor layer 20 in the front-back direction and the left-right direction. That is, when seen in the up-down direction, an outer boundary of the reference conductor layer 22 includes an outer boundary of the antenna conductor layer 20.

The reference conductor layer 24 is provided on the insulative substrate 12. When the antenna conductor layer 20 is provided on the upper main surface of the insulative substrate 12, the reference conductor layer 24 is provided on the upper main surface of the insulative substrate 12. When the antenna conductor layer 20 is provided on the lower main surface of the insulative substrate 12, the reference conductor layer 24 is provided on the lower main surface of the insulative substrate 12. According to the present preferred embodiment, the reference conductor layer 24 is provided on the upper main surface of the insulative substrate 12. The reference conductor layer 24 is provided on the upper main surface of the insulator layer 16*a* on which the antenna conductor layer 20 is provided. When seen in the up-down direction, the reference conductor layer 24 has a rectangular or substantially rectangular frame shape. Thus, when seen in the up-down direction, the reference conductor layer 24 surrounds a region around the antenna conductor layer 20. However, in order to avoid short circuiting between the antenna conductor layer 20 and the reference conductor layer 24, the antenna conductor layer 20 and the reference conductor layer 24 are spaced apart from each other.

The reference conductor layer 26 is provided in the insulative substrate 12. According to the present preferred embodiment, the reference conductor layer 26 is provided on the upper main surface of the insulator layer 16*c*. However, the shape of the reference conductor layer 26 is the same or substantially the same as the shape of the reference conductor layer 24. However, in order to avoid short circuiting between the reference conductor layer 26 and the signal conductor layer 28, the reference conductor layer 26 is not in contact with the signal conductor layer 28.

The plurality of interlayer connection conductors v1 electrically connect the reference conductor layer 22, the reference conductor layer 24, and the reference conductor layer 26 to each other. In more detail, the plurality of interlayer connection conductors v1 extend through the insulator layers 16*a* to 16*e* in the up-down direction. Upper ends of the plurality of interlayer connection conductors v1 are connected to the reference conductor layer 24. Intermediate portions of the plurality of interlayer connection conductors v1 are connected to the reference conductor layer 26. Lower ends of the plurality of interlayer connection conductors v1 are connected to the reference conductor layer 22. When seen in the up-down direction, the plurality of interlayer connection conductors v1 are arranged along the reference conductor layer 24. That is, when seen in the up-down direction, the plurality of interlayer connection conductors v1 are arranged so as to surround the antenna conductor layer 20.

The antenna conductor layer 20, the reference conductor layers 22, 24, and 26, and the signal conductor layer 28 as described above are formed by, for example, etching metal foils provided on upper main surfaces or lower main surfaces of the insulator layers 16*a* to 16*e*. The metal foils are, for example, copper foils. Furthermore, the interlayer connection conductors v1 and v2 are, for example, via hole conductors. The via hole conductors are created by forming through holes in the insulator layers 16*a* to 16*e*, filling the through holes with electrically conductive paste, and solidifying the electrically conductive paste by heat. The interlayer connection conductors v1 and v2 may be, for example, through hole conductors. The through hole conductors are created by forming through holes that extend through a subset or all of the insulator layers 16*a* to 16*e* and plating the through holes.

Next, an insulative substrate non-forming region A0 and a void Sp0 are described. As illustrated in FIG. 2, the insulative substrate non-forming region A0 is formed by recessing a portion of the upper main surface of the insulative substrate 12 in the lower direction. The insulative substrate non-forming region A0 is positioned between the insulative substrate 12 and the antenna conductor layer 20 in the up-down direction. That is, a plurality of insulative substrate non-forming regions A0 are provided between the insulator layer 16*a* and the antenna conductor layer 20 in the up-down direction. Thus, the insulative substrate non-forming region A0 is positioned below the antenna conductor layer 20 and the reference conductor layer 24. The insulative substrate 12 does not exist in the insulative substrate non-forming region A0. According to the present preferred embodiment, the insulative substrate non-forming region A0 is the void Sp0.

Hereinafter, an "outer boundary" and an "inner boundary" are described. Herein, for example, outer boundary E1 of the antenna conductor layer 20 means a boundary of the antenna conductor layer 20 positioned at an outer side portion when seen in the up-down direction. The antenna conductor layer 20 does not exist outside the outer boundary E1 of the antenna conductor layer 20. According to the present preferred embodiment, the outer boundary E1 has a rectangular or substantially rectangular shape. In contrast, herein, for example, an inner boundary E2 of the reference conductor layer 24 means a boundary of the reference conductor layer 24 positioned at an inner side portion when seen in the up-down direction. The inner boundary E2 of the reference conductor layer 24 is positioned in a region surrounded by outer boundary of the reference conductor layer 24. The reference conductor layer 24 exists outside the inner boundary E2 of the reference conductor layer 24. According to the present preferred embodiment, the inner boundary E2 has a rectangular or substantially rectangular shape. When seen in the up-down direction, the inner boundary E2 surrounds the outer boundary E1. Furthermore, the distance between the inner boundary E2 and the outer boundary E1 is uniform or substantially uniform.

Furthermore, a conductor non-forming region A11 is provided between the outer boundary E1 of the antenna conductor layer 20 and the inner boundary E2 of the reference conductor layer 24. The conductor non-forming region A11 is a region where a conductor does not exist. When seen in the up-down direction, the conductor non-forming region A11 has a rectangular or substantially rectangular frame shape.

When seen in the up-down direction, the insulative substrate non-forming region A0 and the void Sp0 extend along the outer boundary E1 of the antenna conductor layer 20 and the inner boundary E2 of the reference conductor layer 24. That is, when seen in the up-down direction, the insulative substrate non-forming region A0 and the void Sp0 overlap the conductor non-forming region A11. Accordingly, when seen in the up-down direction, the insulative substrate non-forming region A0 and the void Sp0 have a rectangular or substantially rectangular frame shape. Thus, when seen in the up-down direction, the insulative substrate non-forming region A0 and the void Sp0 surround a region around the antenna conductor layer 20. Furthermore, when seen in the up-down direction, the reference conductor layer 24 surrounds a region around the insulative substrate non-forming region A0 and the void Sp0.

However, when seen in the up-down direction, an inner boundary P1 of the insulative substrate non-forming region A0 and the void Sp0 overlap the antenna conductor layer 20. Thus, the void Sp0 exists between the outer boundary E1 of the antenna conductor layer 20 and the insulative substrate 12. As a result, the entirety or substantially the entirety of the outer boundary E1 of an antenna conductor overlaps, when seen in the up-down direction, the insulative substrate non-forming region A0 and is not in contact with the insulative substrate 12.

Furthermore, when seen in the up-down direction, an outer boundary P2 of the insulative substrate non-forming region A0 and the void Sp0 overlap the reference conductor layer 24. Thus, the void Sp0 exists between the inner boundary E2 of the reference conductor layer 24 and the insulative substrate 12. As a result, when seen in the up-down direction, the entirety or substantially the entirety of the inner boundary E2 of the reference conductor layer 24 overlaps the insulative substrate non-forming region A0 and is not in contact with the insulative substrate 12.

Next, the plurality of first openings Op1, the plurality of first insulative substrate non-forming regions A1, and the plurality of first voids Sp1 are described. The plurality of first openings Op1 are provided in the antenna conductor layer 20. When seen in the up-down direction, the plurality of first openings Op1 are disposed in a matrix configuration. When seen in the up-down direction, the plurality of first openings Op1 each have an annular outer boundary. According to the present preferred embodiment, when seen in the up-down direction, the plurality of first openings Op1 each have a circular or substantially circular outer boundary. However, the annular shape is not limited to a circular or substantially circular shape but may be, for example, a rectangular or substantially rectangular shape or a triangular or substantially triangular shape. As described above, the annular outer boundary does not include an end. Accordingly, the first openings Op1 do not include a cutout. An outer boundary of the cutout includes an end. The outer boundary of the cutout is a portion where a portion of an outer boundary of the antenna conductor layer 20 is curved toward the center of the antenna conductor layer 20. Thus, the outer boundary of the cutout is a portion of the antenna conductor layer 20. The antenna conductor layer 20 does not exist in the first openings Op1. The distance between the plurality of first openings Op1 adjacent to each other is, for example, smaller than or equal to about one quarter of the wavelength of the radio-frequency signal to be transmitted and received by the antenna conductor layer 20.

The plurality of first insulative substrate non-forming regions A1 are provided in the insulative substrate 12. According to the present preferred embodiment, the plurality of first insulative substrate non-forming regions A1 are provided in the insulator layer 16*a*. Thus, the plurality of first insulative substrate non-forming regions A1 are positioned below the antenna conductor layer 20. The insulative substrate 12 does not exist in the plurality of first insulative substrate non-forming regions A1. According to the present preferred embodiment, the plurality of first insulative substrate non-forming regions A1 are the first voids Sp1.

When seen in the up-down direction, the plurality of first insulative substrate non-forming regions A1 are disposed in a matrix configuration so as to correspond to the plurality of first openings Op1. When seen in the up-down direction, the plurality of first insulative substrate non-forming regions A1 each include an annular outer boundary. According to the present preferred embodiment, when seen in the up-down direction, the plurality of first insulative substrate non-forming regions A1 each include a circular or substantially circular outer boundary. However, when seen in the up-down direction, the plurality of first insulative substrate non-forming regions A1 each include a corresponding one of the plurality of first openings Op1. That is, each of the plurality of first openings Op1 does not extend off a corresponding one of the plurality of first insulative substrate non-forming regions A1. Thus, the diameter of the first insulative substrate non-forming regions A1 is greater than the diameter of the first openings Op1. Furthermore, the first insulative substrate non-forming regions A1 each have a hemispherical shape.

Next, the plurality of second openings Op2, the plurality of second insulative substrate non-forming regions A2, and the plurality of second voids Sp2 are described. The plurality of second openings Op2, the plurality of second insulative substrate non-forming regions A2, and the plurality of second voids Sp2 are structured so as to be symmetrical or substantially symmetrical with the plurality of first openings Op1, the plurality of first insulative substrate non-forming regions A1, and the plurality of first voids Sp1 in the up-down direction. Accordingly, description of the plurality of second openings Op2, the plurality of second insulative substrate non-forming regions A2, and the plurality of second voids Sp2 is omitted.

As illustrated in FIG. 2, the electronic device 1 includes the antenna element 10 and the housing 100. The antenna element 10 is accommodated in the housing 100. The electronic device 1 is, for example, a mobile wireless communication terminal such as a smartphone.

Method for Manufacturing Antenna Element

Figure 3:
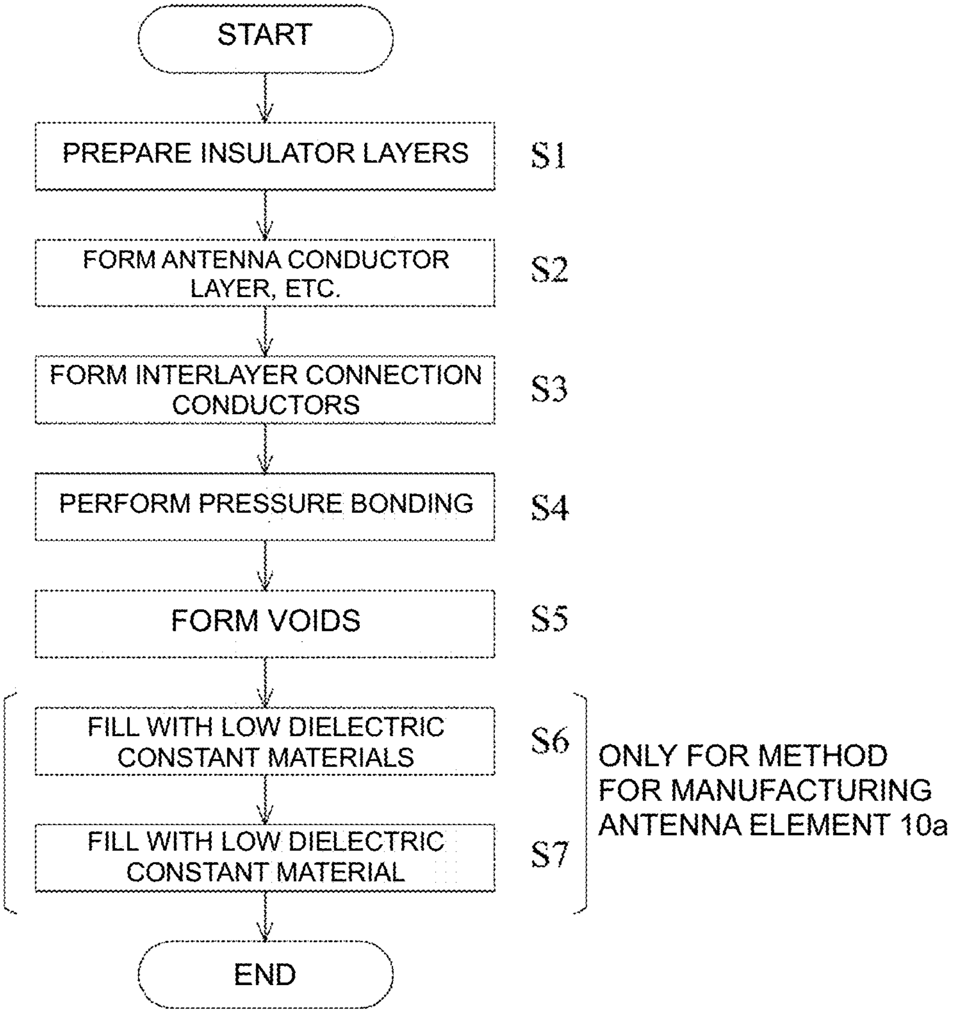
FIG. 3 is a flowchart illustrating manufacturing steps of the antenna element 10 according to a preferred embodiment of the present invention.

Hereinafter, a method for manufacturing the antenna element 10 according to a preferred embodiment of the present invention is described with reference to the drawings. FIG. 3 is a flowchart illustrating manufacturing steps of the antenna element 10.

First, the insulator layers 16*a* to 16*c* to each of which the metal foil is pasted to the upper main surface are prepared. Similarly, the insulator layers 16*d* and 16*e* to each of which the metal foil is pasted to the lower main surface are prepared (step S1).

Next, masks are formed on the metal foils and etching is performed so as to form the antenna conductor layer 20, the reference conductor layers 22, 24, and 26, and the signal conductor layer 28 in the insulator layers 16*a* to 16*e* (step S2).

Next, the plurality of interlayer connection conductors v1 and the interlayer connection conductor v2 are formed in the insulator layers 16*a* to 16*e* (step S3). Specifically, for example, a laser beam is radiated to the insulator layers 16*a* to 16*e* so as to form a plurality of through holes. After that, the plurality of through holes are filled with electrically conductive paste.

Next, the insulator layers 16*a* to 16*e* are subjected to pressure bonding so as to form the insulative substrate 12 (step S4; a pressure bonding step). In the pressure bonding step, the insulator layers 16*a* to 16*e* are heated while being pressurized in the up-down direction. Thus, the insulator layers 16*a* to 16*e* are softened, and the insulator layers 16*a* to 16*e* are integrated together. Furthermore, the electrically conductive paste is solidified by heat, and the plurality of interlayer connection conductors v1 and the interlayer connection conductor v2 are formed.

Next, the void Spa, the plurality of first voids Sp1, and the plurality of second voids Sp2 are formed in the insulator layers 16*a* and 16*e* (step S5). Specifically, the insulator layer 16*a* is etched with the antenna conductor layer 20 used as a mask, thus forming the void Sp0 and the plurality of first voids Sp1 (a first void forming step). Furthermore, the insulator layer 16*e* is etched with the reference conductor layer 22 used as a mask, thus forming the plurality of second voids Sp2 (a second void forming step). Through the above-described steps, the antenna element 10 is completed.

Advantageous Effects

According to the antenna element 10, a reduction of the radiation efficiency of the antenna element 10 can be reduced or prevented. The outer boundary E1 of the antenna conductor layer 20 overlaps, when seen in the up-down direction, the insulative substrate non-forming region A0 and is not in contact with the insulative substrate 12. The insulative substrate non-forming region A0 is the void Sp0. This reduces the dielectric constant of a region near the outer boundary E1 of the antenna conductor layer 20. Thus, the occurrences of an electric field concentration at the outer boundary E1 of the antenna conductor layer 20 are reduced or prevented. As a result, electric field coupling of the antenna conductor layer 20 and the reference conductor layer 24 is reduced or prevented. Thus, radiation of the electromagnetic wave from the antenna conductor layer 20 toward the reference conductor layer 24 is reduced or prevented, and reduction of the radiation efficiency of a microstrip antenna is reduced or prevented.

According to the antenna element 10, a reduction of the radiation efficiency of the antenna element 10 can be reduced or prevented also because the following reason. The inner boundary E2 of the reference conductor layer 24 overlaps, when seen in the up-down direction, the insulative substrate non-forming region A0 and is not in contact with the insulative substrate 12. The insulative substrate non-forming region A0 is the void Sp0. This reduces the dielectric constant of a region near the inner boundary E2 of the reference conductor layer 24. Thus, the occurrences of an electric field concentration at the inner boundary E2 of the reference conductor layer 24 are reduced or prevented. As a result, electric field coupling of the antenna conductor layer 20 and the reference conductor layer 24 is reduced or prevented. Thus, radiation of the electromagnetic wave from the antenna conductor layer 20 toward the reference conductor layer 24 is reduced or prevented, and reduction of the radiation efficiency of a microstrip antenna is reduced or prevented.

According to the antenna element 10, the thickness of the antenna element 10 can be reduced. In more detail, the plurality of first insulative substrate non-forming regions A1 are each positioned below the antenna conductor layer 20. The plurality of second insulative substrate non-forming regions A2 are each positioned above the reference conductor layer 22. The plurality of first insulative substrate non-forming regions A1 are the first voids Sp1, and the plurality of second insulative substrate non-forming regions A2 are the second voids Sp2. This reduces the dielectric constant of a region between the antenna conductor layer 20 and the reference conductor layer 22. Accordingly, in order to form the capacitance of the design value between the antenna conductor layer 20 and the reference conductor layer 22, the distance between the antenna conductor layer 20 and the reference conductor layer 22 can be reduced. Thus, the thickness of the antenna element 10 can be reduced.

According to the antenna element 10, the antenna element 10 can be easily bent. In more detail, in the antenna element 10, the plurality of first voids Sp1, the plurality of second voids Sp2, and the void Sp0 are provided in the insulative substrate 12. Thus, the antenna element 10 is easily deformed. Furthermore, since the thickness of the antenna element 10 is reduced as described above, the antenna element 10 is more easily deformed. As a result, according to the antenna element 10, the antenna element 10 can be easily bent.

According to the antenna element 10, the radiation efficiency of the antenna element 10 can be improved. In more detail, as described above, the dielectric constant of the proximity of the antenna conductor layer 20 is reduced, and accordingly, the wavelength of the radio-frequency signal transmitted through the antenna conductor layer 20 is increased. Accordingly, in order to resonate the radio-frequency signal in the antenna conductor layer 20, the size of the antenna conductor layer 20 may be increased. When the size of the antenna conductor layer 20 is increased, the radiation efficiency of the antenna element 10 is improved.

According to an example of the method for manufacturing the antenna element 10 described above, the void Sp0 can be easily formed. In more detail, the void Sp0 is formed by etching the insulator layer 16*a* with the antenna conductor layer 20 and the reference conductor layer 24 used as the masks. When the antenna conductor layer 20 and the reference conductor layer 22 are used as the masks as described above, formation of a new mask is not required to form the void Sp0. As a result, according to an example of the method for manufacturing the antenna element 10, the void Sp0 can be easily formed.

Since the material of the insulative substrate 12 is, for example, thermoplastic resin, use of a bond layer formed of a different material from the material of the thermoplastic resin is not required to join the insulator layers 16*a* to 16*e*. Thus, the insulative substrate 12 can be easily formed by heat pressure bonding. Furthermore, the insulative substrate 12 can be easily subjected to plastic deformation.

First Variant

Figure 4:
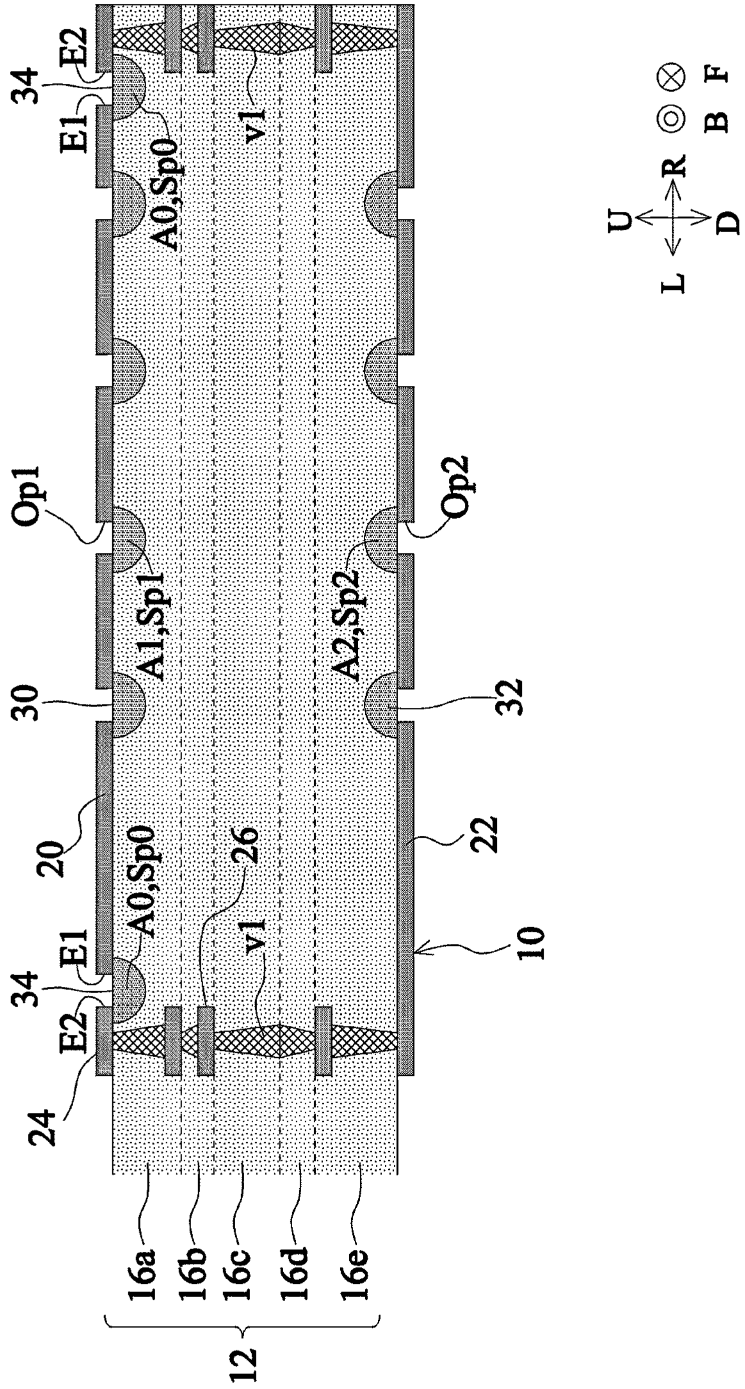
FIG. 4 is a sectional view of an antenna element 10*a* according to a preferred embodiment of the present invention.

Hereinafter, an antenna element 10*a* according to a first variant of a preferred embodiment of the present invention is described with reference to the drawings. FIG. 4 is a sectional view of the antenna element 10*a*.

The antenna element 10*a* is different from the antenna element 10 in three points below.

A low dielectric constant material 30 having a lower dielectric constant than the dielectric constant of the insulative substrate 12 is provided in the plurality of first insulative substrate non-forming regions A1. A low dielectric constant material 32 having a lower dielectric constant than the dielectric constant of the insulative substrate 12 is provided in the plurality of second insulative substrate non-forming regions A2. A low dielectric constant material 34 having a lower dielectric constant than the dielectric constant of the insulative substrate 12 is provided in the insulative substrate non-forming region A0.

The low dielectric constant materials 30, 32, and 34 are, for example, materials made by mixing low dielectric ceramic powder into resin. Since other structures of the antenna element 10*a* are the same or substantially the same as those of the antenna element 10, description thereof is omitted. The antenna element 10*a* as described above produces the same or substantially the same advantageous operational effects as those of the antenna element 10.

Furthermore, a method for manufacturing the antenna element 10*a* further includes step S6 and step S7 of FIG. 3. In more detail, the plurality of first voids Sp1 are filled with the low dielectric constant material 30 having a lower dielectric constant than the dielectric constant of the insulative substrate 12, and the void Sp0 are filled with the low dielectric constant material 34 having a lower dielectric constant than the dielectric constant of the insulative substrate 12 (step S6; a first filling step). Furthermore, the plurality of second voids Sp2 are filled with the low dielectric constant material 32 having a lower dielectric constant than the dielectric constant of the insulative substrate 12 (step S7; a second filling step). The first filling step and the second filling step are executed by, for example, pressing, with a squeegee, paste of the low dielectric constant material 30 into the plurality of first voids Sp1, paste of low dielectric constant material 32 into the plurality of second voids Sp2, and paste of low dielectric constant material 34 into the void Sp0. When the plurality of first voids Sp1 and the void Sp0 are filled with the low dielectric constant materials 30 and 34 as described above, deformation of the outer boundary E1 of the antenna conductor layer 20 and the inner boundary E2 of the reference conductor layer 24 is reduced or prevented.

Second Variant

Figure 5:
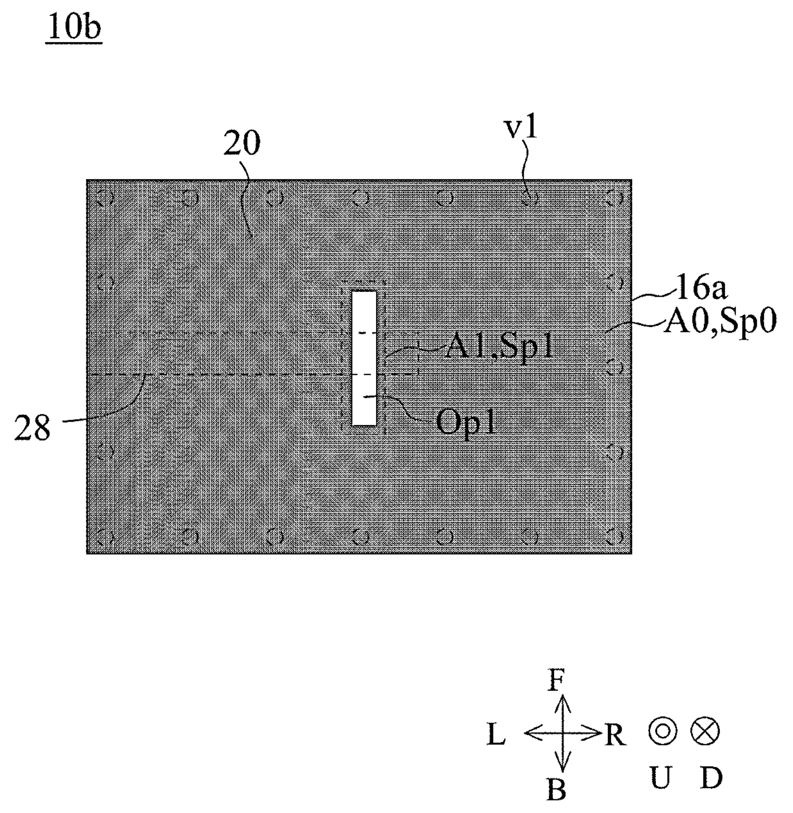
FIG. 5 is a top view of an insulator layer 16*a* of an antenna element 10*b* according to a preferred embodiment of the present invention.

Hereinafter, an antenna element 10*b* according to a second variant of a preferred embodiment of the present invention is described with reference to the drawings. FIG. 5 is a top view of the insulator layer 16*a* of the antenna element 10*b*.

The antenna element 10*b* is different from the antenna element 10 in the structure of the antenna conductor layer 20, the number and the shape of the first openings Op1, and the number and the shape of the first insulative substrate non-forming regions A1. In more detail, the antenna conductor layer 20 and the reference conductor layer 24 are integrated with each other. In this way, the ground potential is connected to the antenna conductor layer 20. In the antenna element 10*b*, the number of the first openings Op1 is one. The number of the first insulative substrate non-forming regions A1 is one. Furthermore, when seen in the up-down direction, the first opening Op1 has a strip shape extending in the front-back direction. The length of the first opening Op1 in the front-back direction is about half the wavelength of the radio-frequency signal to be transmitted and received by the antenna conductor layer 20. When seen in the up-down direction, the first insulative substrate non-forming region A1 has a strip shape extending in the front-back direction. When seen in the up-down direction, the signal conductor layer 28 overlaps the first opening Op1. However, the signal conductor layer 28 is not connected to the antenna conductor layer 20 via an interlayer connection conductor. In such an antenna element 10*b*, the antenna conductor layer 20 defines and functions as a slot antenna. Since other structures of the antenna element 10*b* are the same or substantially the same as those of the antenna element 10, description thereof is omitted. According to the antenna element 10*b*, the same or substantially the same advantageous operational effects as those of the antenna element 10 can be produced.

Third Variant

Figure 6:
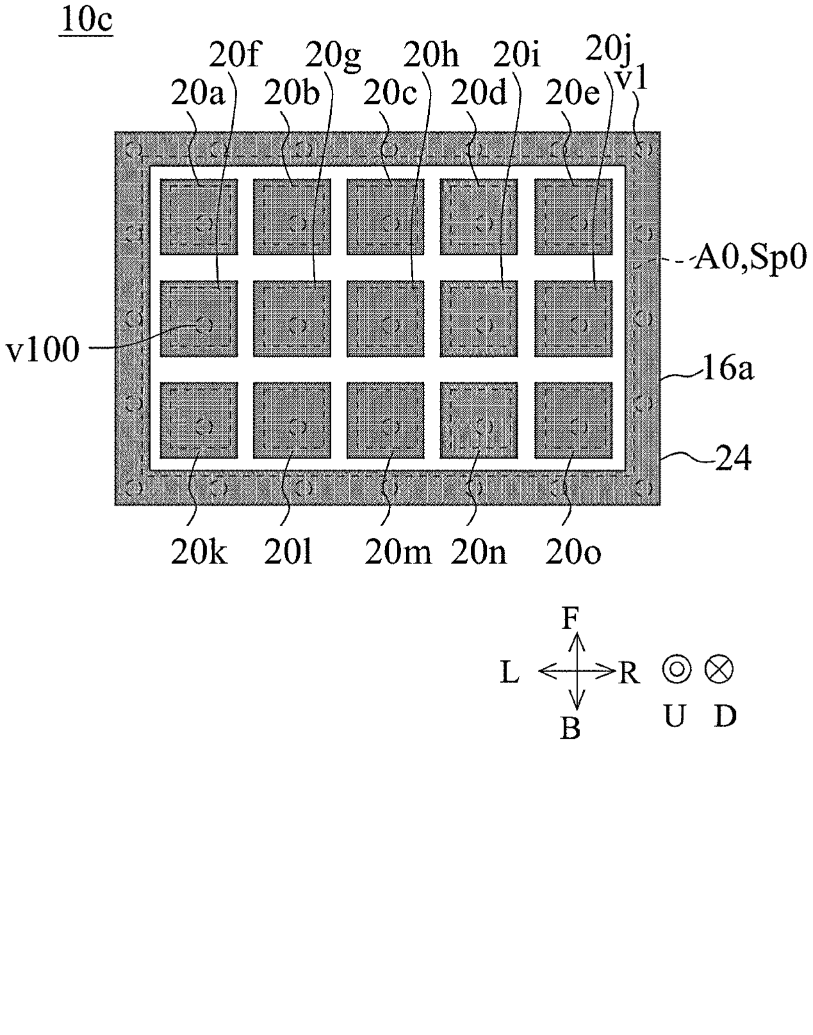
FIG. 6 is a top view of the insulator layer 16*a* of an antenna element 10*c* according to a preferred embodiment of the present invention.
Figure 7:
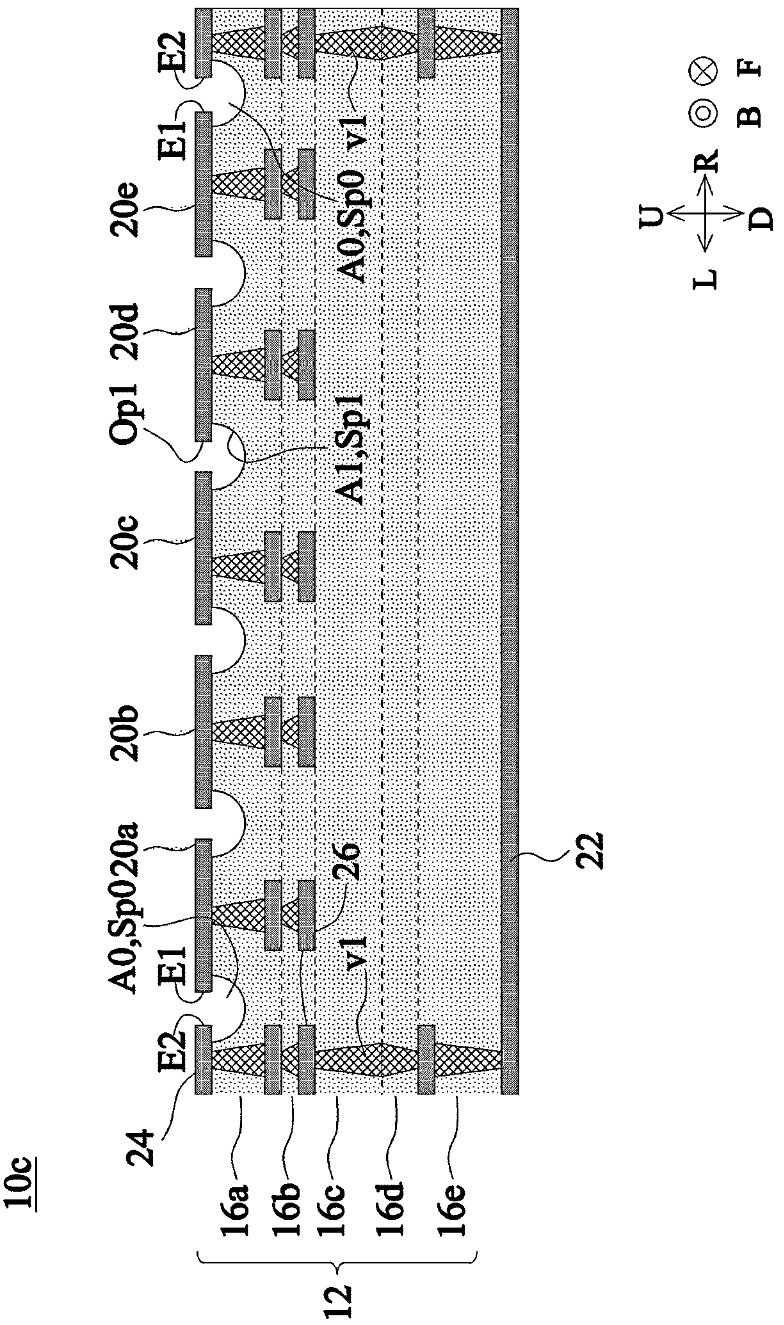
FIG. 7 is a sectional view of the antenna element 10*c*.

Hereinafter, an antenna element 10*c* according to a third variant of a preferred embodiment of the present invention is described with reference to the drawings. FIG. 6 is a top view of the insulator layer 16*a* of the antenna element 10*c*. FIG. 7 is a sectional view of the antenna element 10*c*.

The antenna element 10*c* is different from the antenna element 10 in that the antenna element 10*c* includes a plurality of antenna conductor layers 20*a* to 20*o*. The antenna conductor layers 20*a* to 20*o* are provided on the upper main surface of the insulative substrate 12. Accordingly, the antenna conductor layers 20*a* to 20*o* are provided on the upper main surface of the insulator layer 16*a*. When seen in the up-down direction, the antenna conductor layers

20*a* to 20*o* are disposed in a matrix configuration. Although it is not illustrated, the antenna conductor layers 20*a* to 20*o* are electrically connected to a signal conductor layer (not illustrated) via interlayer connection conductors v100. Since other structures of the antenna element 10*c* are the same or substantially the same as those of the antenna element 10, description thereof is omitted. According to the antenna element 10*c*, the same or substantially the same advantageous operational effects as those of the antenna element 10 can be produced. Furthermore, when the first insulative substrate non-forming regions A1 are provided between the antenna conductor layers 20*a* to 20*o*, interference of the radio-frequency signal between the antenna conductor layers 20*a* to 20*o* can be reduced or prevented. Furthermore, since the antenna conductor layers 20*a* to 20*o* can be close to each other, the size of the antenna element 10*c* is reduced.

Fourth Variant

Figure 8:
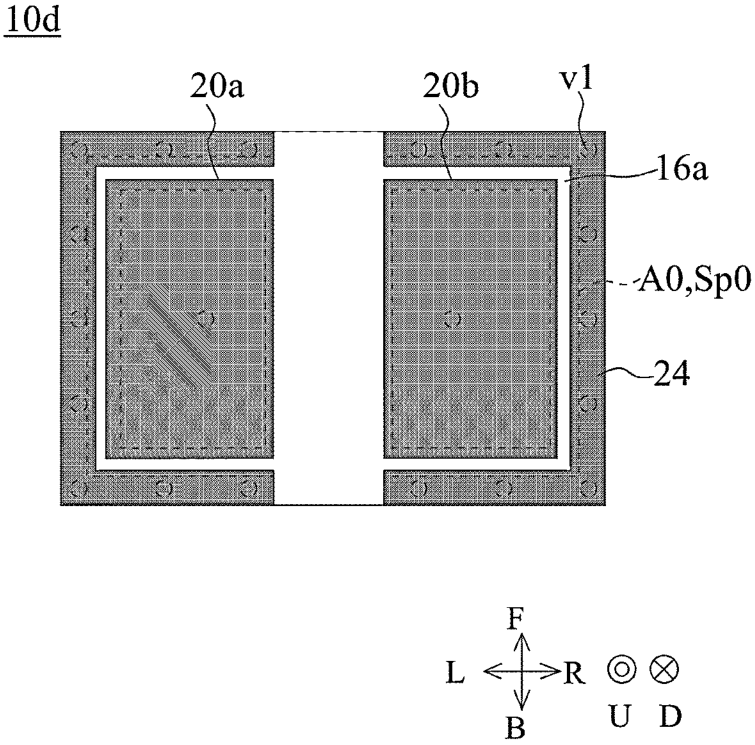
FIG. 8 is a top view of the insulator layer 16*a* of an antenna element 10*d* according to a preferred embodiment of the present invention.
Figure 9:
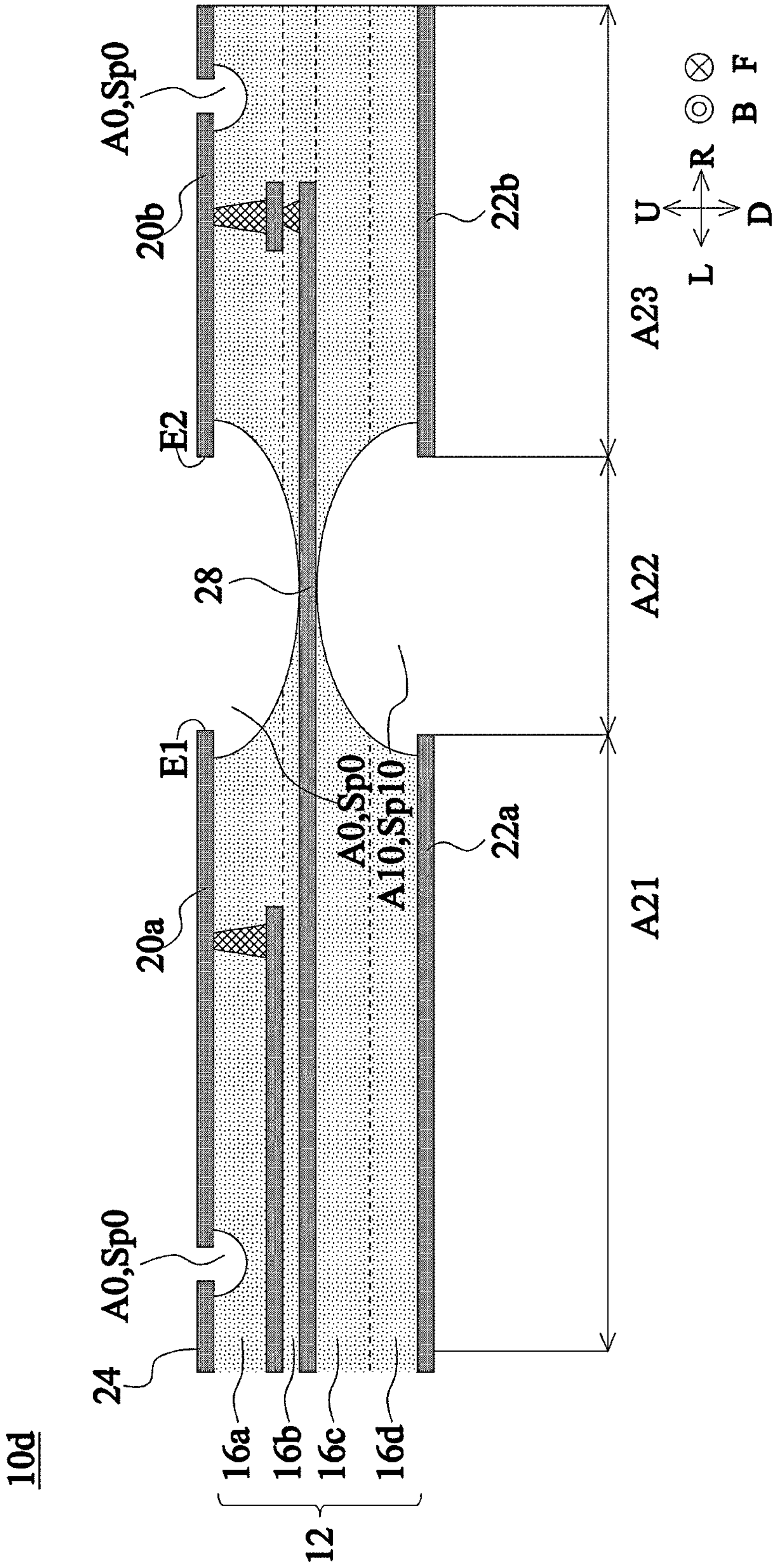
FIG. 9 is a sectional view of the antenna element 10*d*.
Figure 10:
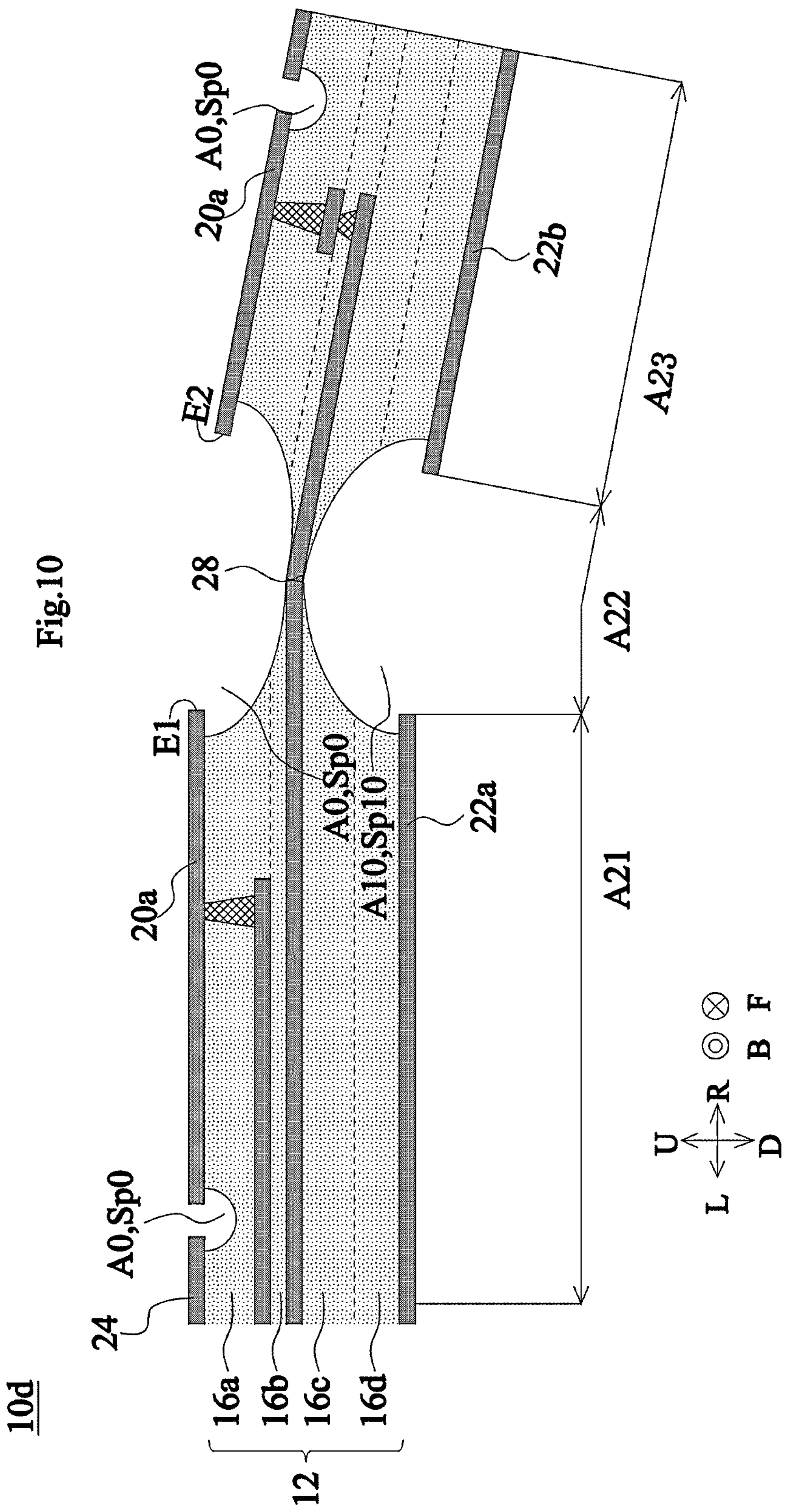
FIG. 10 is a sectional view of the antenna element 10*d*.

Hereinafter, an antenna element 10*d* according to a fourth variant of a preferred embodiment of the present invention is described with reference to the drawings. FIG. 8 is a top view of the insulator layer 16*a* of the antenna element 10*d*. FIGS. 9 and 10 are sectional views of the antenna element 10*d*.

The antenna element 10*d* is different from the antenna element 10 in that the antenna element 10*d* includes antenna conductor layers 20*a* and 20*b* and reference conductor layers 22*a* and 22*b*. The antenna conductor layers 20*a* and 20*b* are provided on the upper main surface of the insulator layer 16*a*. The antenna conductor layers 20*a* and 20*b* are arranged in this order from left to right. The reference conductor layers 22*a* and 22*b* are provided on the lower main surface of the insulator layer 16*d*. The reference conductor layers 22*a* and 22*b* are provided in this order from left to right. The reference conductor layers 22*a* and 22*b* are electrically connected to each other via a conductor layer and an interlayer connection conductor (not illustrated). This conductor layer is provided on the upper main surface of the insulator layer 16*c*. Furthermore, the reference conductor layers 22*a*, 22*b*, and 24 are electrically connected to each other via a conductor layer and an interlayer connection conductor (not illustrated).

Here, the antenna element 10*d* includes first sections A21 and A23 and a second section A22. The first section A21, the second section A22, and the first section A23 are arranged in this order from left to right. The second section A22 is bent relative to the first section A21 in a negative direction of the z axis (up-down direction in the first section A21). The radius of curvature of the second section A22 is smaller than the radius of curvature of the first sections A21 and A23. According to the present preferred embodiment, the first section A21 or A23 in not bent in the z axis direction.

In such an antenna element 10*d*, the insulative substrate non-forming region A0 is positioned in the second section A22. Accordingly, the void Sp0 is positioned in the second section A22. The insulative substrate non-forming region AC and the void Sp0 extend to the signal conductor layer 28. Furthermore, an insulative substrate non-forming region A10 and a void Sp10 are further provided in the insulative substrate 12. The insulative substrate non-forming region A10 and the void Sp10 extend to the signal conductor layer 28. As a result, the thickness of the antenna element 10*d* in the up-down direction is greater in the first sections A21 and A23 than in the second section A22. Accordingly, in the antenna element 10*d*, the antenna element 10*d* can be easily bent in the z axis direction in the second section A22. Since other structures of the antenna element 10*d* are the same or substantially the same as those of the antenna element 10, description thereof is omitted. According to the antenna element 10*d*, the same or substantially the same advantageous operational effects as those of the antenna element 10 can be produced.

Fifth Variant

Figure 11:
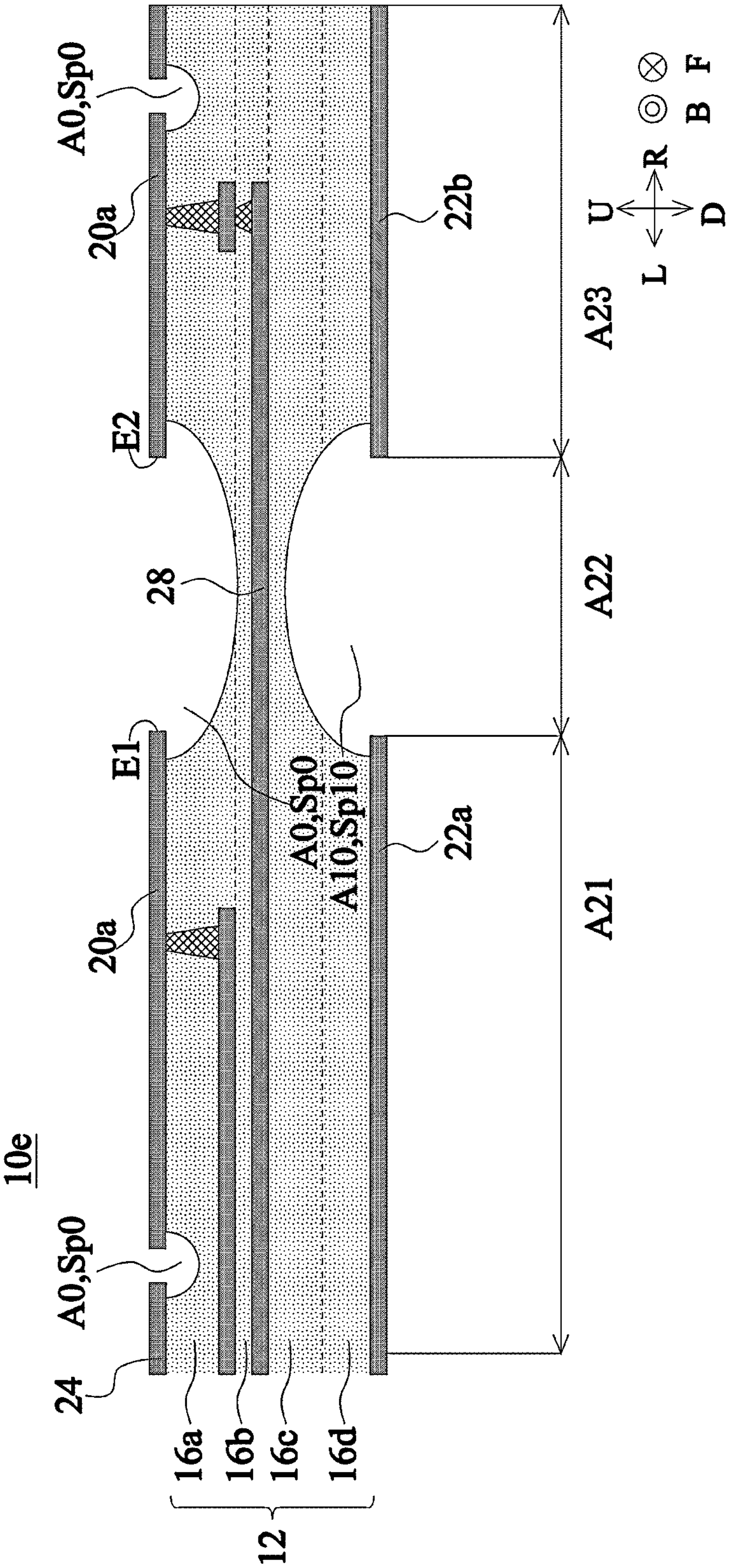
FIG. 11 is a sectional view of an antenna element 10*e* according to a preferred embodiment of the present invention.

Hereinafter, an antenna element 10*e* according to a fifth variant of a preferred embodiment of the present invention is described with reference to the drawings. FIG. 11 is a sectional view of the antenna element 10*e*.

The antenna element 10*e* is different from the antenna element 10*d* in that, in the antenna element 10*e*, neither the insulative substrate non-forming region AC nor the void Sp0 extends to the signal conductor layer 28 and neither the insulative substrate non-forming region A10 nor the void Sp10 extends to the signal conductor layer 28. Since other structures of the antenna element 10*e* are the same or substantially the same as those of the antenna element 10*d*, description thereof is omitted. According to the antenna element 10*e*, the same or substantially the same advantageous operational effects as those of the antenna element 10*d* can be produced.

Sixth Variant

Figure 12:
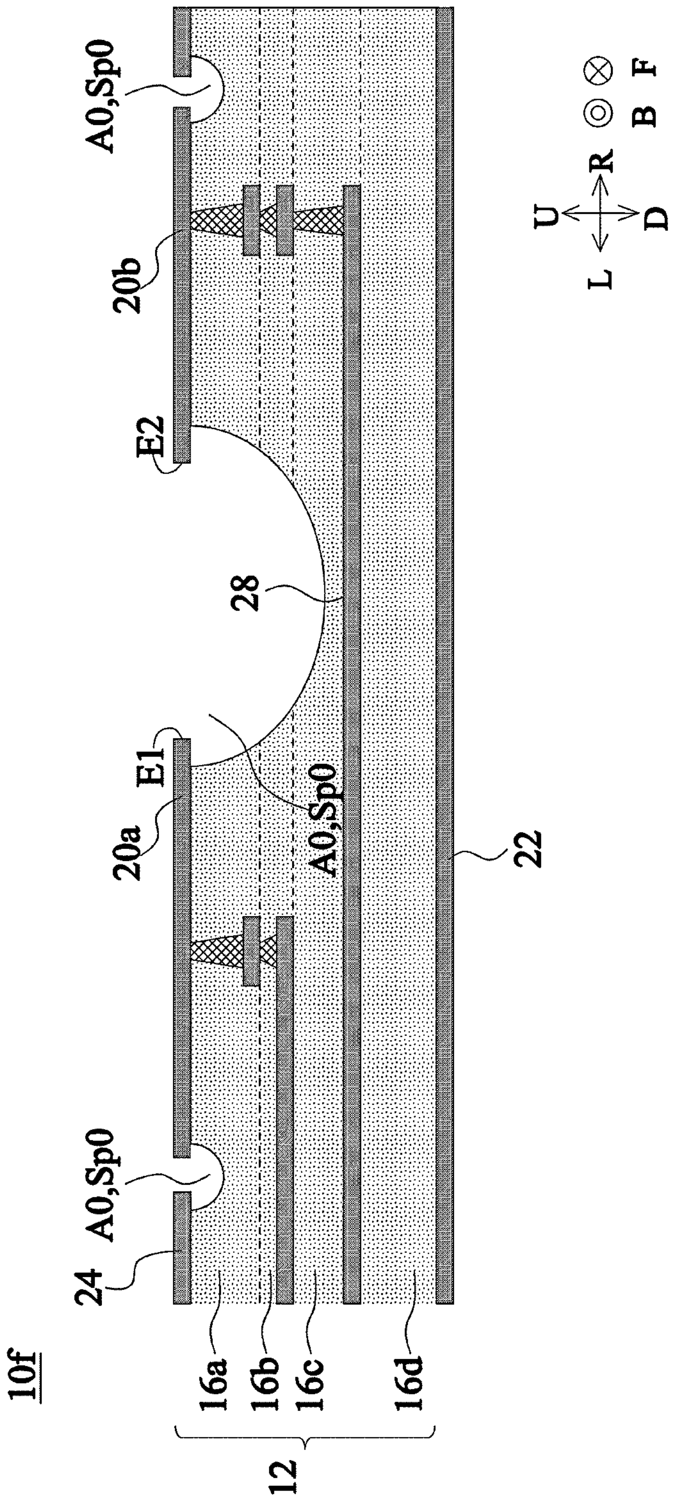
FIG. 12 is a sectional view of an antenna element 10*f* according to a preferred embodiment of the present invention.

Hereinafter, an antenna element 10*f* according to a sixth variant of a preferred embodiment of the present invention is described with reference to the drawings. FIG. 12 is a sectional view of the antenna element 10*f*.

The antenna element 10*f* is different from the antenna element 10*e* in that the insulative substrate non-forming region A10 or the void Sp10 is not provided in the antenna element 10*f*. Since other structures of the antenna element 10*f* are the same or substantially the same as those of the antenna element 10*e*, description thereof is omitted. According to the antenna element 10*f*, the same or substantially the same advantageous operational effects as those of the antenna element 10*e* can be produced.

Seventh Variant

Figure 13:
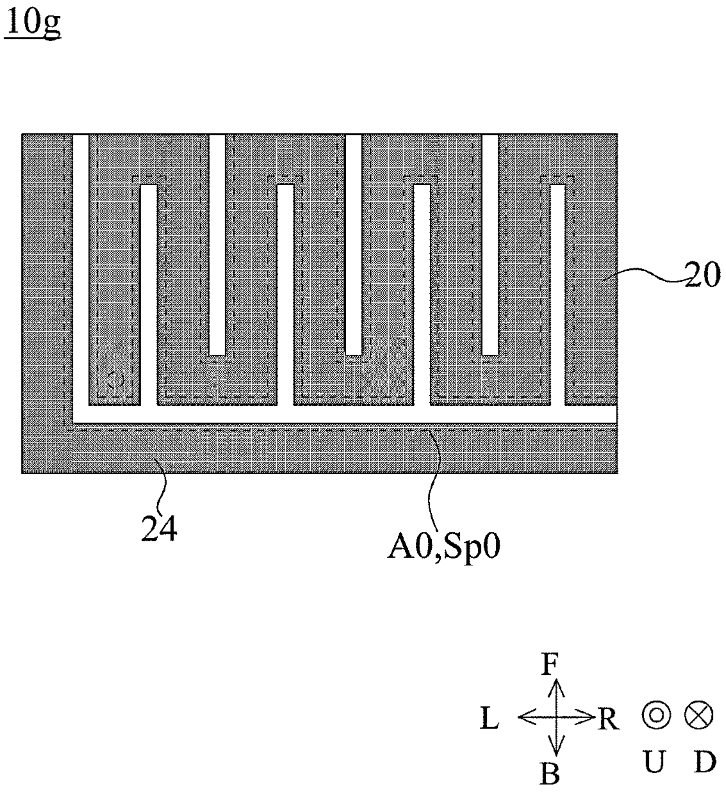
FIG. 13 is a top view of the insulator layer 16*a* of an antenna element 10*g* according to a preferred embodiment of the present invention.
Figure 14:
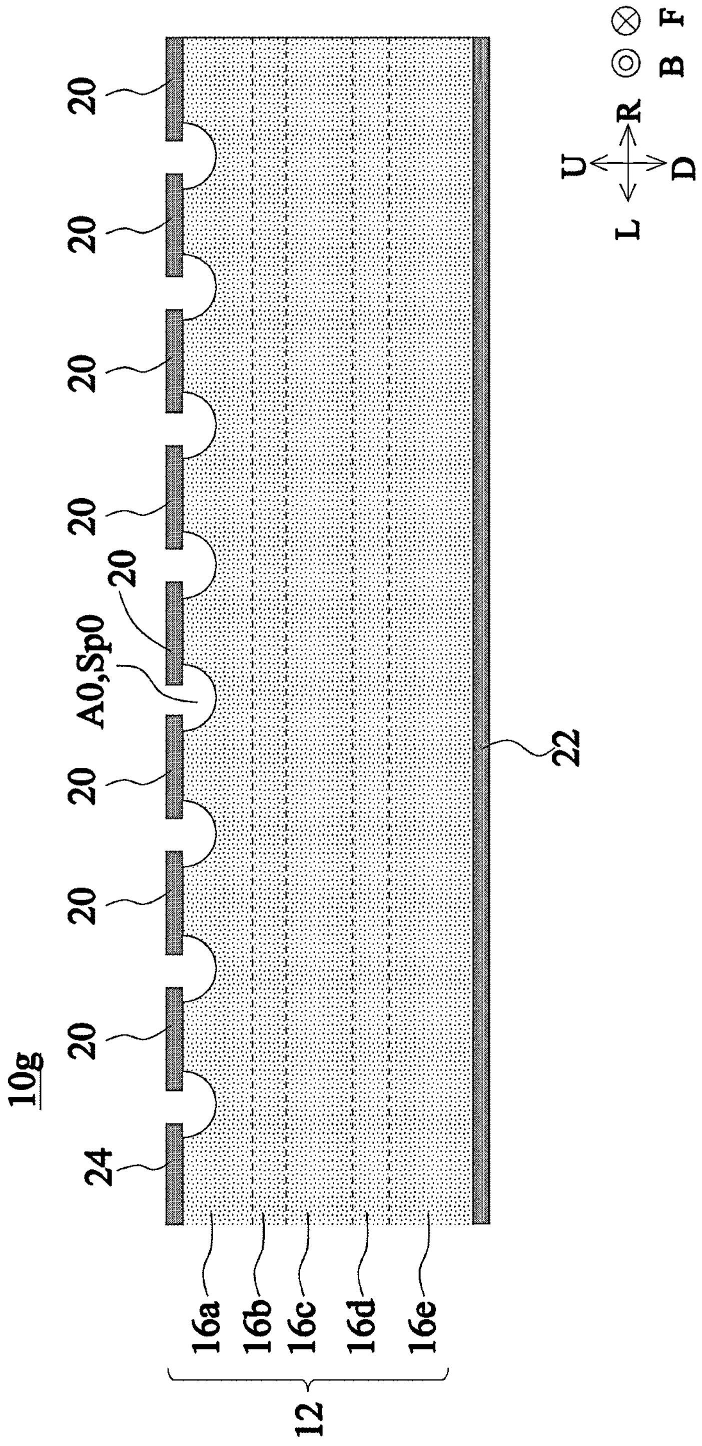
FIG. 14 is a sectional view of the antenna element 10*g*.

Hereinafter, an antenna element 10*g* according to a seventh variant of a preferred embodiment of the present invention is described with reference to the drawings. FIG. 13 is a top view of the insulator layer 16*a* of the antenna element 10*g*. FIG. 14 is a sectional view of the antenna element 10*g*.

The antenna element 10*g* is different from the antenna element 10 in the shape of the antenna conductor layer 20 and the shape of the reference conductor layer 24. In more detail, when seen in the up-down direction, the antenna conductor layer 20 has a meandering shape. That is, when seen in the up-down direction, the antenna conductor layer 20 meanders. Furthermore, when seen in the up-down direction, the reference conductor layer 24 has an L shape. Specifically, the reference conductor layer 24 extends in the front-back direction on the left side of the antenna conductor layer 20 and extends in the left-right direction at the back of the antenna conductor layer 20. Since other structures of the antenna element 10*g* are the same or substantially the same as those of the antenna element 10, description thereof is omitted. According to the antenna element 10*g*, the same or substantially the same advantageous operational effects as those of the antenna element 10 can be produced.

Furthermore, in the antenna element 10*g*, the electrical length of the antenna conductor layer 20 is increased. Accordingly, the frequency of the radio-frequency signal resonating in the antenna conductor layer 20 is reduced.

Eighth Variant

Figure 15:
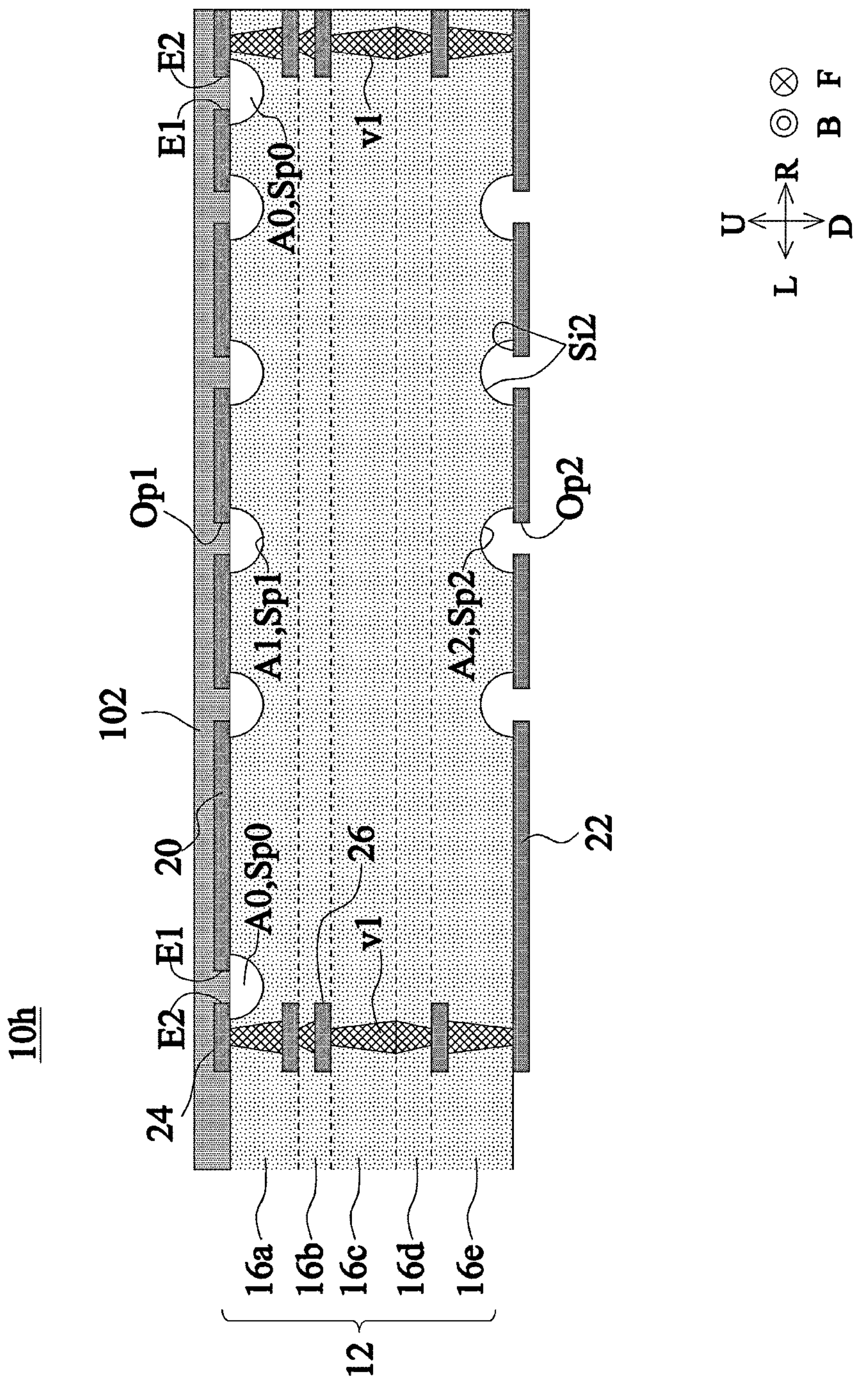
FIG. 15 is a sectional view of an antenna element 10*h* according to a preferred embodiment of the present invention.

Hereinafter, an antenna element 10*h* according to an eighth variant of a preferred embodiment of the present invention is described with reference to the drawings. FIG. 15 is a sectional view of the antenna element 10*h*.

The antenna element 10*h* is different from the antenna element 10 in that the antenna element 10*h* further includes a protective layer 102. The antenna conductor layer 20 is provided on the upper main surface of the insulative substrate 12. The protective layer 102 covers the antenna conductor layer 20 and is provided on the upper main surface of the insulative substrate 12. The material of the protective layer 102 is different from the material of the insulator layers 16*a* to 16*e*. Accordingly, the protective layer 102 is not a portion of the insulative substrate 12. The Young's modulus of the material of the protective layer 102 is, for example, greater than the Young's modulus of the material of the insulator layers 16*a* to 16*e*. Since other structures of the antenna element 10*h* are the same or substantially the same as those of the antenna element 10, description thereof is omitted. According to the antenna element 10*h*, the same or substantially the same advantageous operational effects as those of the antenna element 10 can be produced.

According to the antenna element 10*h*, the antenna conductor layer 20 is protected and the structure of the void Sp0 is protected. Furthermore, when the dielectric constant of the protective layer 102 is higher than the dielectric constant of the insulator layers 16*a* to 16*e*, the frequency band width of the radio-frequency signal communicable with the antenna element 10*h* increases. When the thickness of the protective layer 102 in the up-down direction is made to be the same or substantially the same as the wavelength of the radio-frequency signal, the dielectric constant of the protective layer 102 may be lower than the dielectric constant of the insulator layers 16*a* to 16*e*.

Ninth Variant

Figure 16:
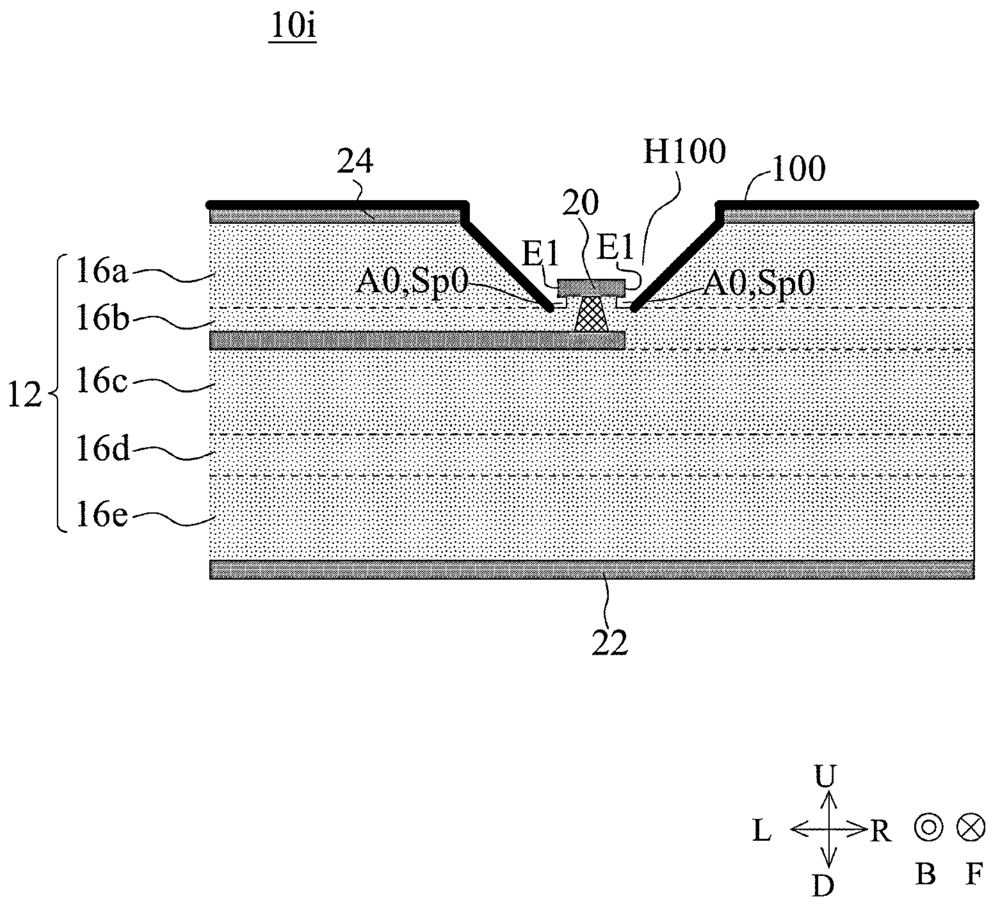
FIG. 16 is a sectional view of an antenna element 10*i*.
Figure 17:
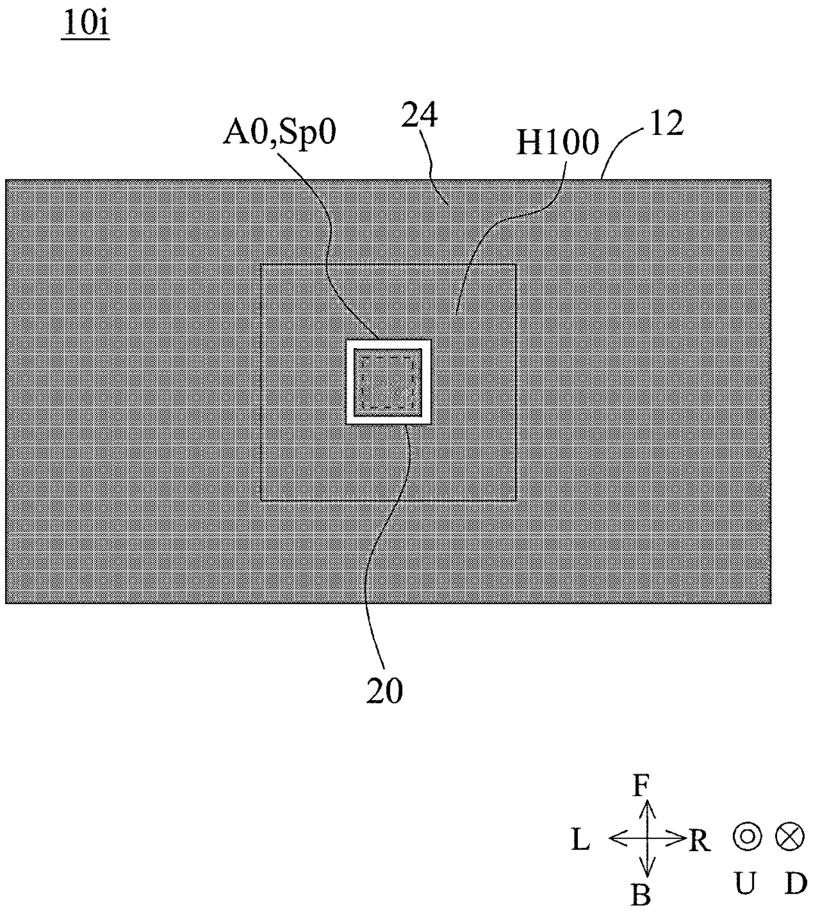
FIG. 17 is a top view of the antenna element 10*i* according to a preferred embodiment of the present invention.
Figure 18:
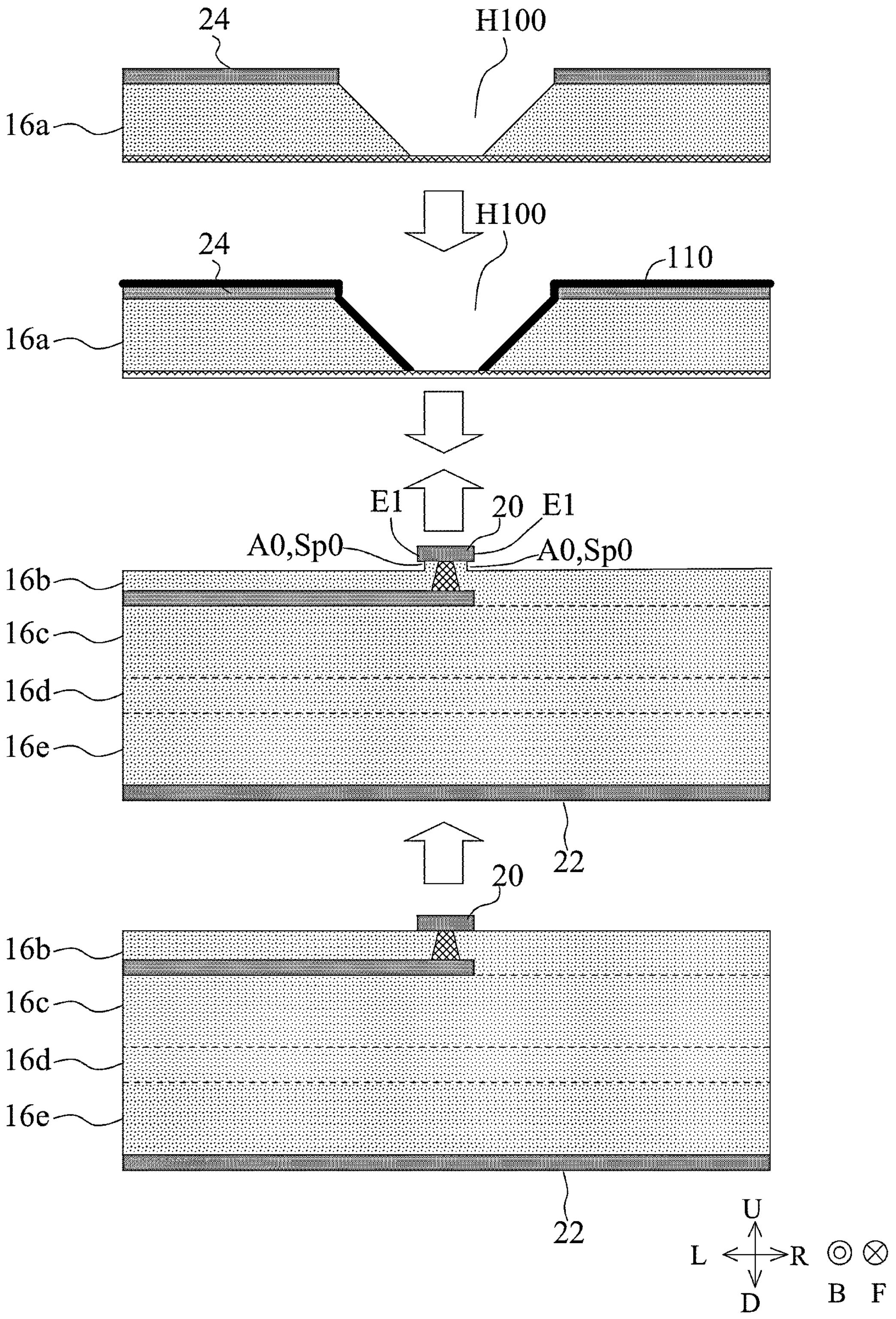
FIG. 18 includes sectional views of the antenna element 10*i* during the manufacture of the antenna element 10*i*.

Hereinafter, an antenna element 10*i* according to a ninth variant of a preferred embodiment of the present invention is described with reference to the drawings. FIG. 16 is a sectional view of the antenna element 10*i*. FIG. 17 is a top view of the antenna element 10*i*. FIG. 18 includes sectional views of the antenna element 10*i* during the manufacture of the antenna element 10*i*.

As illustrated in FIGS. 16 and 17, the antenna element 10*i* is different from the antenna element 10 in that the antenna element 10*i* has a horn antenna structure. The antenna conductor layer 20 is provided on the upper main surface of the insulator layer 16*b*. However, as illustrated in FIG. 18, the upper surface of the insulator layer 16*b* is removed by etching before pressure bonding of the insulator layers 16*a* to 16*e*. In so doing, the antenna conductor layer 20 is used as the mask. Thus, the insulator layer 16*b* remains below the antenna conductor layer 20 so as to be in contact with the antenna conductor layer 20. However, the insulative substrate non-forming region A0 where the insulator layer 16*b* does not exist is positioned below the outer boundary E1 of the antenna conductor layer 20. That is, the void Sp0 is positioned below the outer boundary E1 of the antenna conductor layer 20.

Furthermore, when seen in the up-down direction, the insulator layer 16*a* positioned around the antenna conductor layer 20 is removed. Thus, a through hole H100 is provided in the insulator layer 16*a*. The through hole H100 has such a shape that the area of the through hole H100 in a section perpendicular or substantially perpendicular to the up-down direction increases upward. Furthermore, a plated layer 110 that covers an inner circumferential surface of the through hole H100 is provided. The plated layer 110 is electrically connected to the reference conductor layer 24. Since other structures of the antenna element 10*i* are the same or substantially the same as those of the antenna element 10, description thereof is omitted. According to the antenna element 10*i*, the same or substantially the same advantageous operational effects as those of the antenna element 10 can be produced. Furthermore, since the air exists around the antenna conductor layer 20, the radiation efficiency of the antenna conductor layer 20 is high. Furthermore, when the antenna element 10*i* has the horn antenna structure, the antenna element 10*i* has a high directivity.

Tenth Variant

Figure 19:
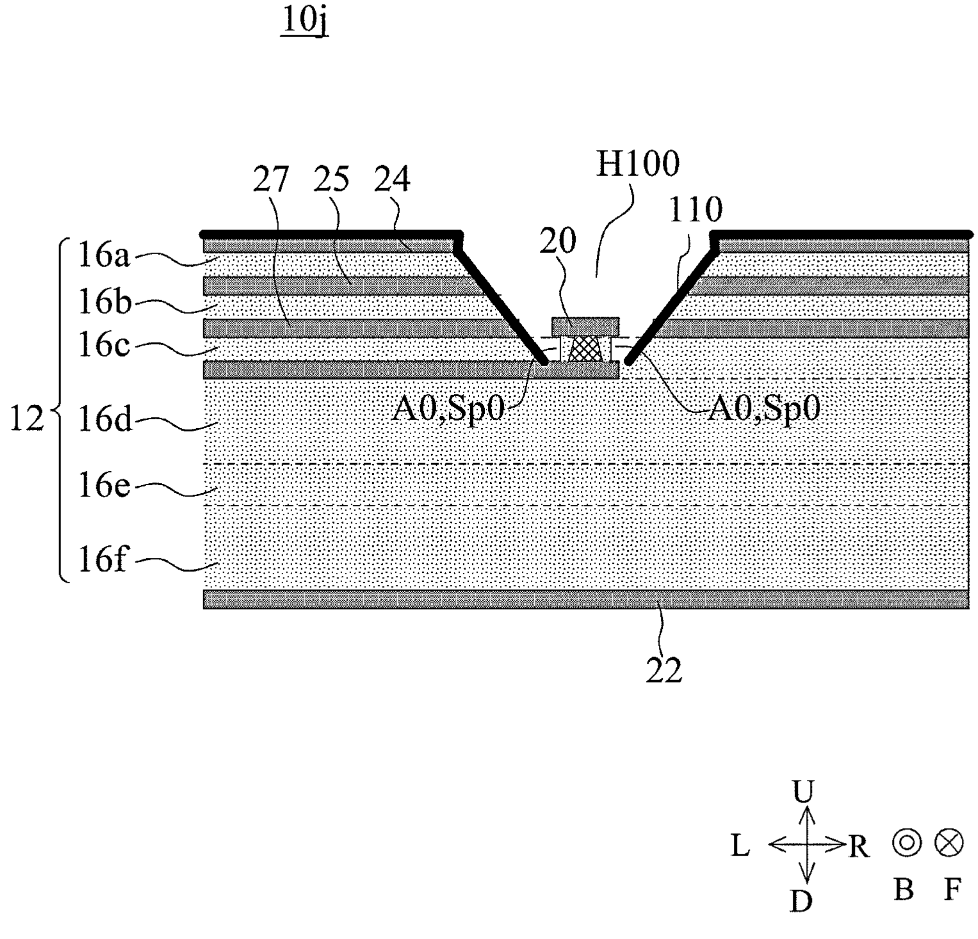
FIG. 19 is a sectional view of an antenna element 10*j* according to a preferred embodiment of the present invention.
Figure 20:
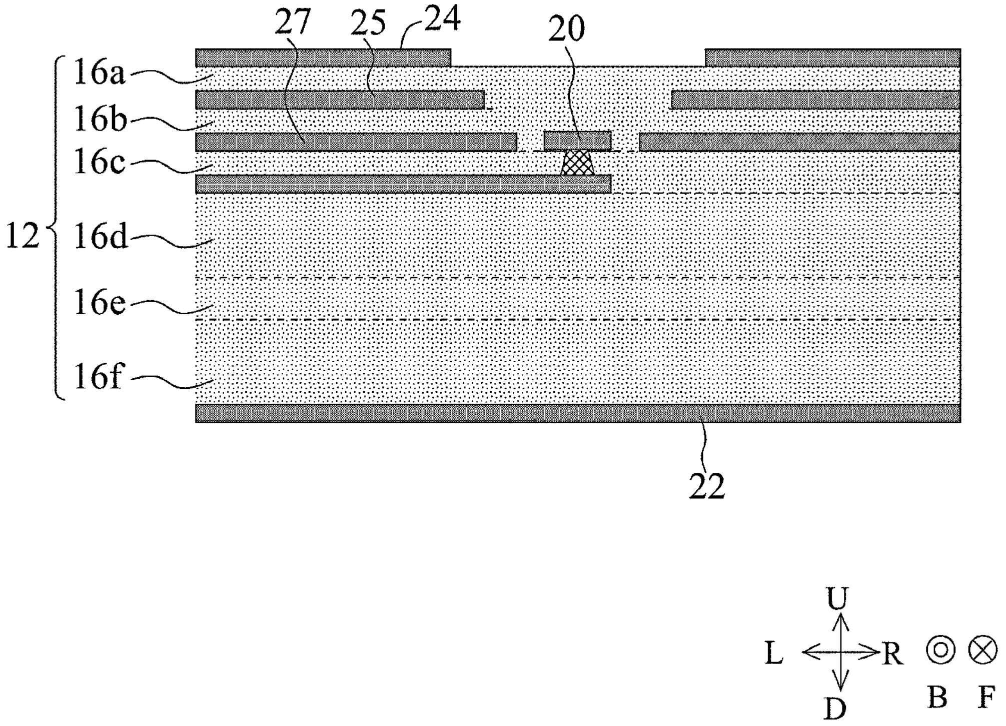
FIG. 20 is a sectional view of the antenna element 10*j* during the manufacture of the antenna element 10*j*.

Hereinafter, an antenna element 10*j* according to a tenth variant of a preferred embodiment of the present invention is described with reference to the drawings. FIG. 19 is a sectional view of the antenna element 10*j*. FIG. 20 is a sectional view of the antenna element 10*j* during the manufacture of the antenna element 10*j*.

The antenna element 10*j* is different from the antenna element 10*i* in that the antenna element 10*j* further includes reference conductor layers 25 and 27. The reference conductor layers 25 and 27 are provided below the reference conductor layer 24. The reference conductor layers 25 and 27 are exposed in the through hole H100. The plated layer 110 covers the inner circumferential surface of the through hole H100 and the reference conductor layers 25 and 27 exposed in the inner circumferential surface of the through hole H100. In such an example of a method for manufacturing the antenna element 10*j*, the through hole H100 is formed in the insulator layers 16*a* and 16*b* after the insulator layers 16*a* to 16*f* have been laminated and subjected to pressure bonding. Then, the plated layer 110 is formed on the inner circumferential surface of the through hole H100. Since other structures of the antenna element 10*j* are the same or substantially the same as those of the antenna element 10*i*, description thereof is omitted. According to the antenna element 10*j*, the same or substantially the same advantageous operational effects as those of the antenna element 10*i* can be produced.

Eleventh Variant

Figure 21:
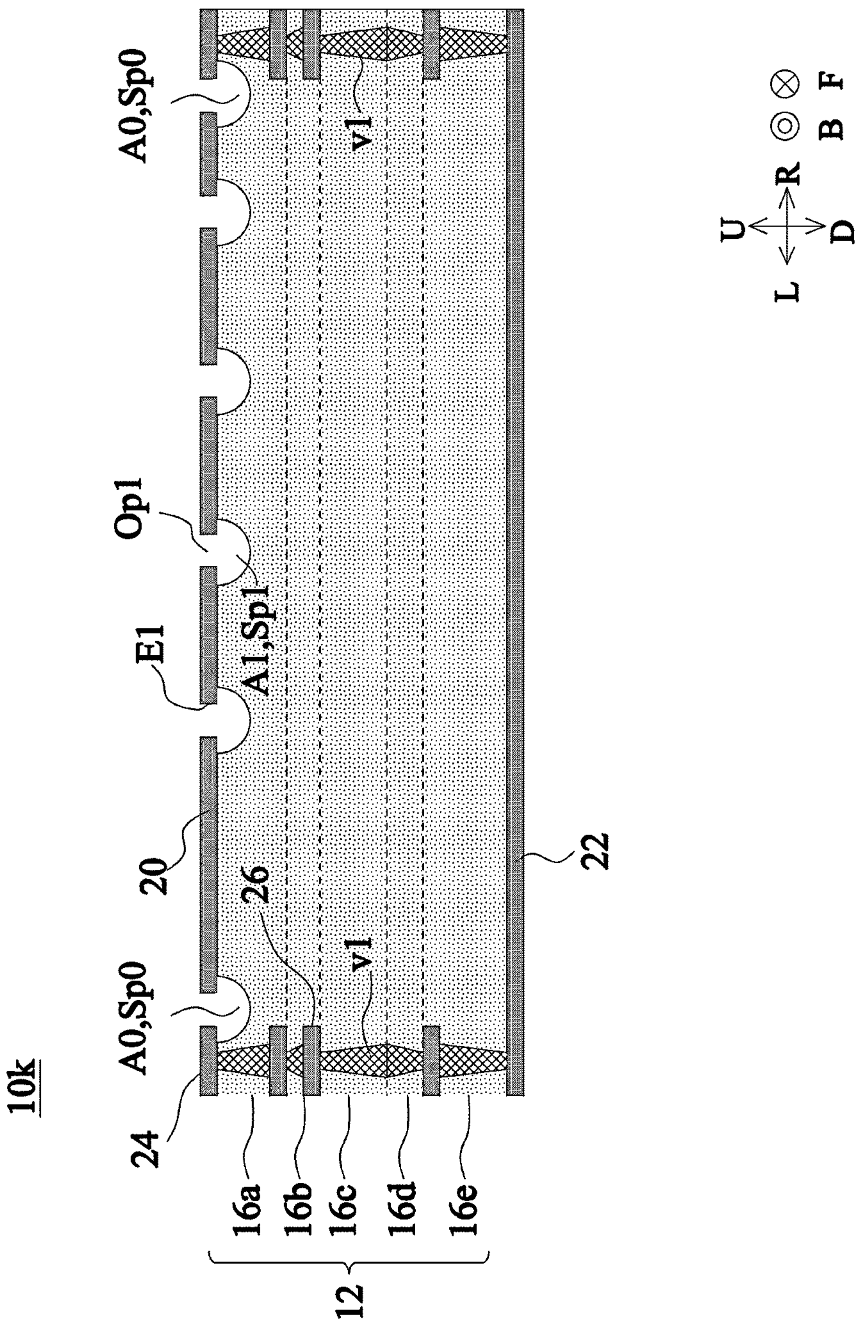
FIG. 21 is a sectional view of an antenna element 10*k* according to a preferred embodiment of the present invention.

Hereinafter, an antenna element 10*k* according to an eleventh variant of a preferred embodiment of the present invention is described with reference to the drawings. FIG. 21 is a sectional view of the antenna element 10*k*.

The antenna element 10*k* is different from the antenna element 10 in that neither the second openings Op2 nor the second insulative substrate non-forming regions A2 exist in the antenna element 10*k*. Since other structures of the antenna element 10*k* are the same or substantially the same as those of the antenna element 10, description thereof is omitted. The antenna element 10*k* can produce the same or substantially the same advantageous operational effects as those of the antenna element 10.

Twelfth Variant

Figure 22:
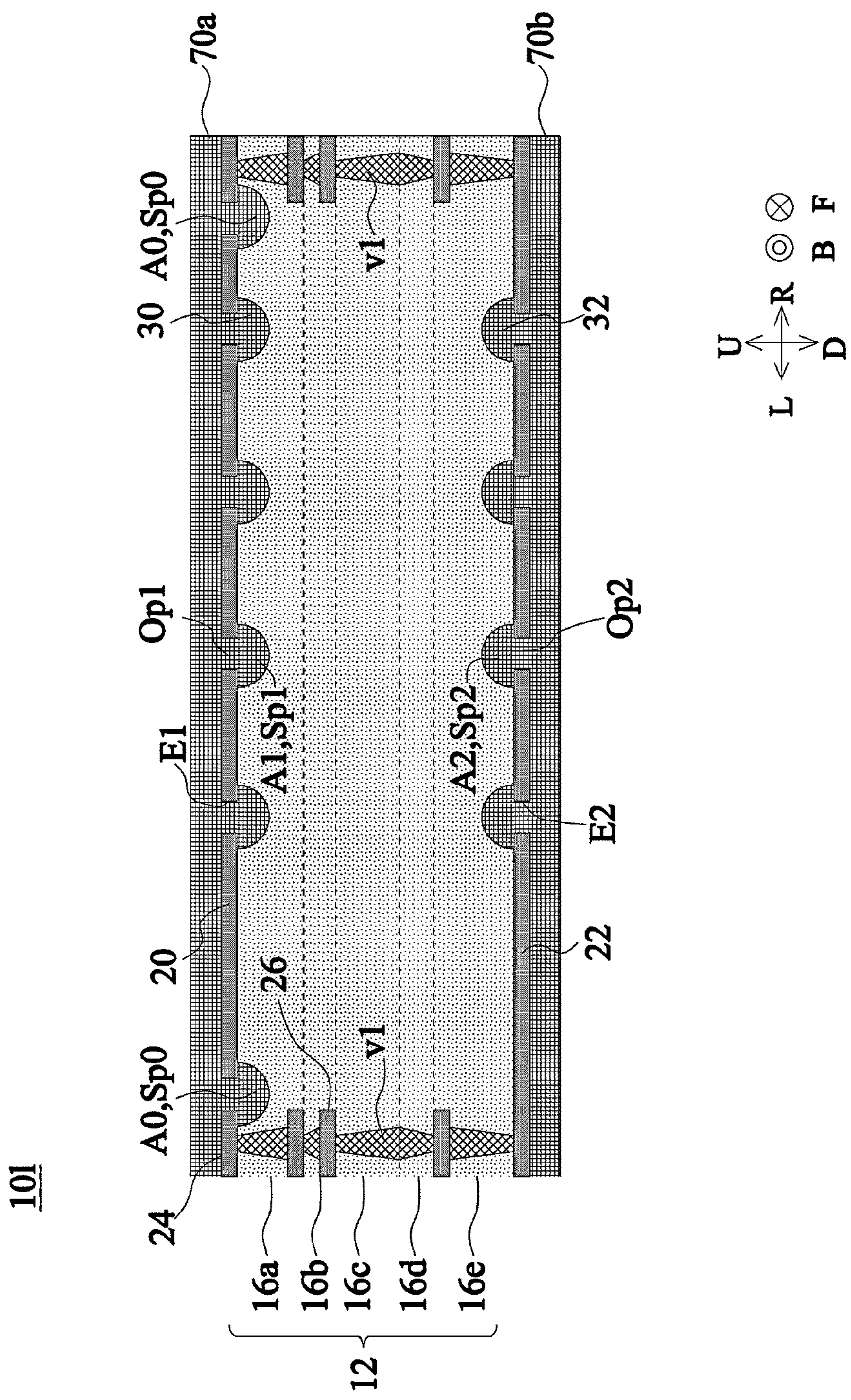
FIG. 22 is a sectional view of an antenna element 10*l* according to a preferred embodiment of the present invention.

Hereinafter, an antenna element 10*l* according to a twelfth variant of a preferred embodiment of the present invention is described with reference to the drawings. FIG. 22 is a sectional view of the antenna element 10*l*.

The antenna element 10*l* is different from the antenna element 10*a* in that the antenna element 10*l* further includes a first protective layer 70*a* and a second protective layer 70*b*. The first protective layer 70*a* covers the upper main surface (the first main surface) of the insulative substrate 12. The dielectric constant of the first protective layer 70*a* is greater than the dielectric constant of the insulative substrate 12. The second protective layer 70*b* covers the lower main surface (the second main surface) of the insulative substrate 12. The dielectric constant of the second protective layer 70*b* is greater than the dielectric constant of the insulative substrate 12. Other structures of the antenna element 10*d* are the same or substantially the same as those of the antenna element 10*a*. The antenna element 10*l* can produce the same or substantially the same advantageous operational effects as those of the antenna element 10*a*.

Furthermore, the first protective layer 70*a* covers the upper main surface (the first main surface) of the insulative substrate 12. This increases an advantageous effect of shortening the wavelength of the radio-frequency signal to be transmitted and received by the antenna conductor layer 20. Furthermore, the antenna conductor layer 20 is protected by the first protective layer 70*a*. Furthermore, filling of the first insulative substrate non-forming regions A1 and the second insulative substrate non-forming regions A2 with the material and forming of the first protective layer 70*a* can be simultaneously performed.

Thirteenth Variant

Figure 23:
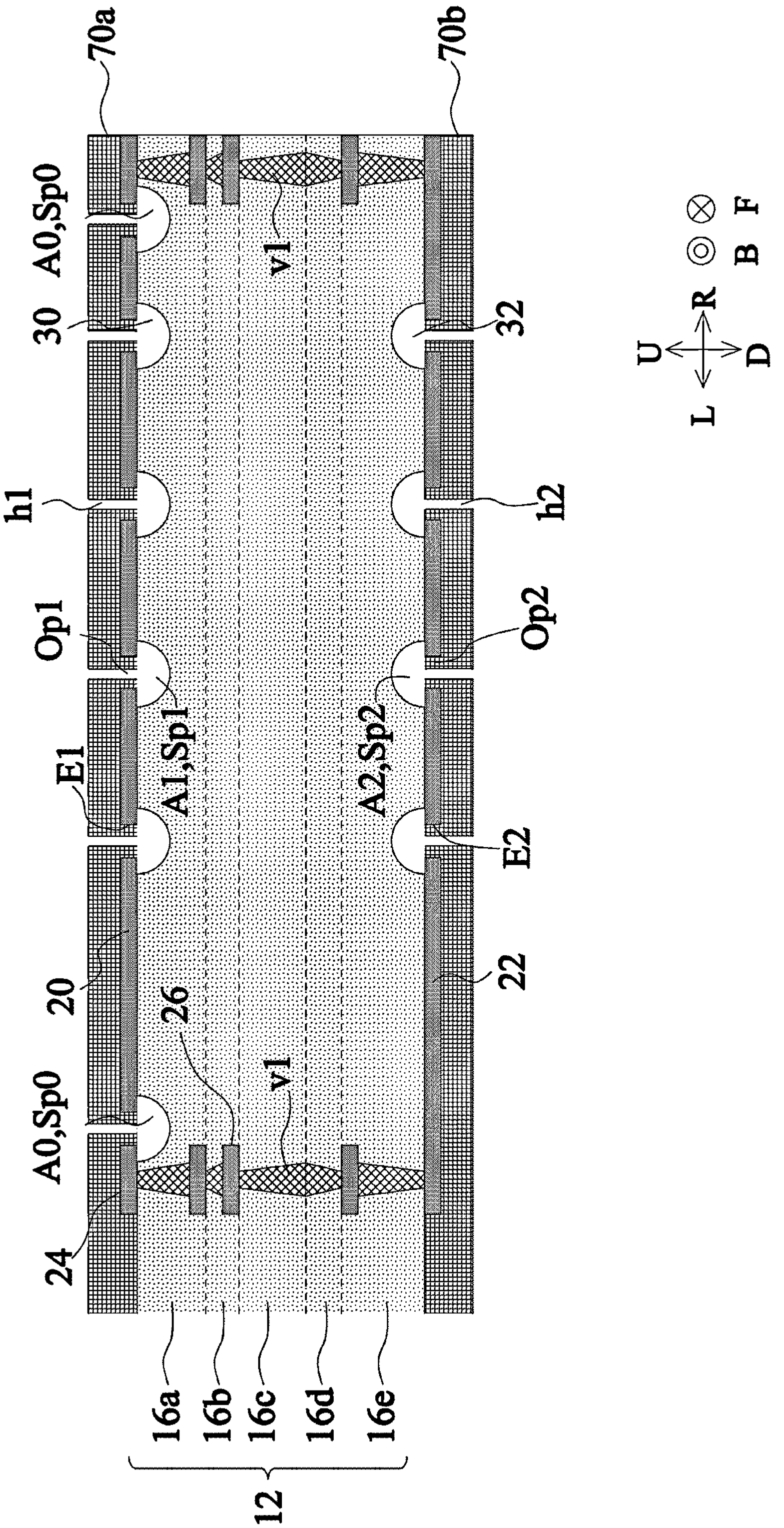
FIG. 23 is a sectional view of an antenna element 10*m* according to a preferred embodiment of the present invention.

Hereinafter, an antenna element 10*m* according to a thirteenth variant of a preferred embodiment of the present invention is described with reference to the drawings. FIG. 23 is a sectional view of the antenna element 10*m*.

The antenna element 10*m* is different from the antenna element 10*l* in that, in the antenna element 10*m*, a plurality of through holes h1 are provided in the first protective layer 70*a* and a plurality of through holes h2 are provided in the second protective layer 70*b*. When seen in the up-down direction, the through holes h1 are provided in portions of the first protective layer 70*a* that overlap at least one of the first openings Op1 and the void Sp0. The through holes h1 extend through the first protective layer 70*a* in the up-down direction. The diameter of the first through holes h1 is smaller than the diameter of the first openings Op1. When seen in the up-down direction, the through holes h2 are provided in portions of the second protective layer 70*b* that each overlap a corresponding one of at least one of the second openings Op2. The diameter of the second through holes h2 is smaller than the diameter of the second openings Op2. Other structures of the antenna element 10*m* are the same or substantially the same as those of the antenna element 10*l*. The antenna element 10*m* can produce the same or substantially the same advantageous operational effects as those of the antenna element 10*l*.

Since the through holes h1 are provided in the first protective layer 70*a*, the air can flow into or out of the first voids Sp1. Accordingly, even when the air in the first voids Sp1 expands or contracts due to variations of temperature caused by reflowing or the like, the first protective layer 70 is unlikely to peel off from the insulative substrate 12.

Fourteenth Variant

Figure 24:
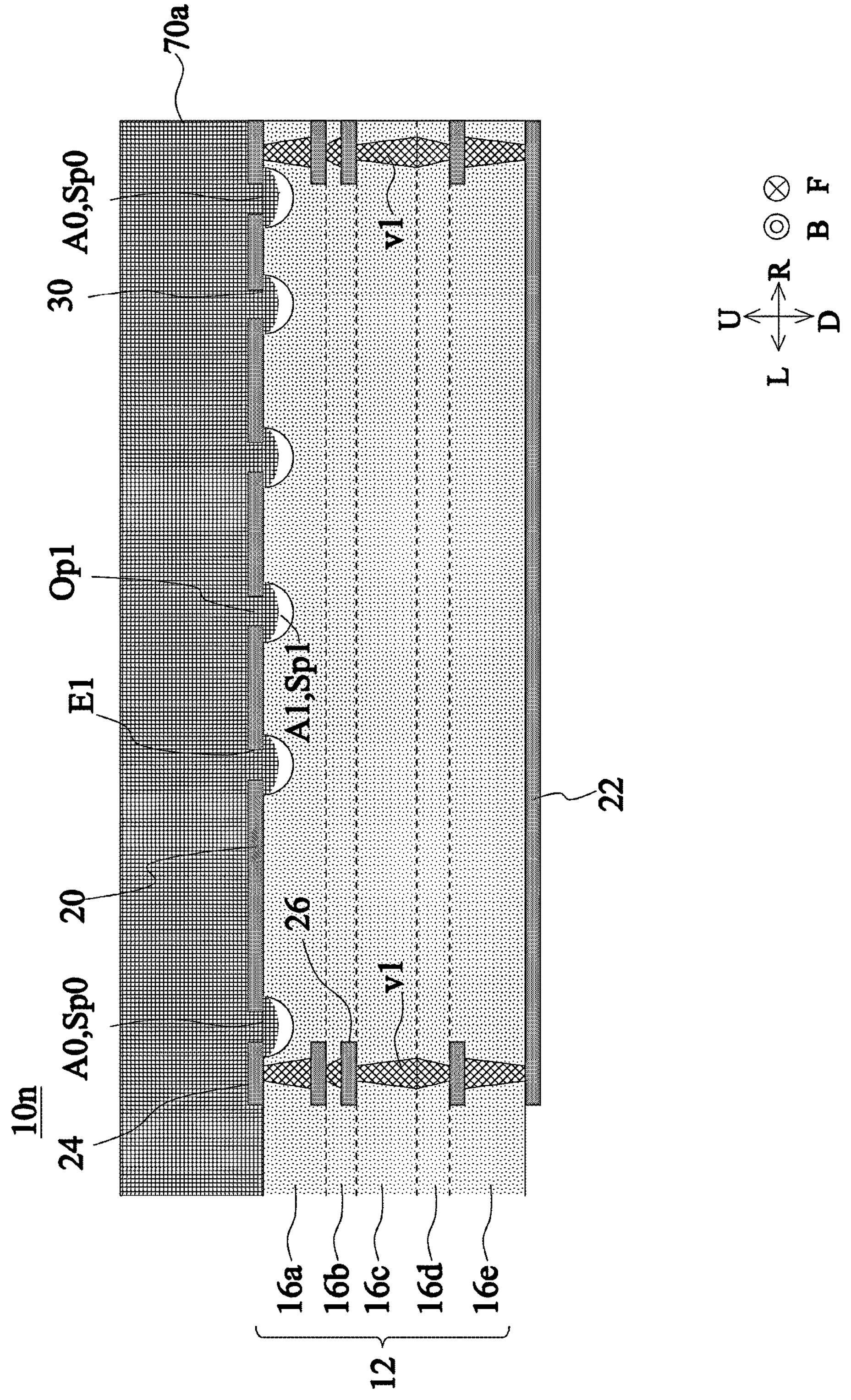
FIG. 24 is a sectional view of an antenna element 10*n* according to a preferred embodiment of the present invention.

Hereinafter, an antenna element 10*n* according to a fourteenth variant of a preferred embodiment of the present invention is described with reference to the drawings. FIG. 24 is a sectional view of the antenna element 10*n*.

The antenna element 10*n* is different from the antenna element 10*k* in that the antenna element 10*n* further includes the first protective layer 70*a*. The first protective layer 70*a* covers the upper main surface (the first main surface) of the insulative substrate 12. The dielectric constant of the first protective layer 70*a* is greater than the dielectric constant of the insulative substrate 12. Furthermore, the thickness of the first protective layer 70*a* of the antenna element 10*n* in the up-down direction is greater than the thickness of the first protective layer 70*a* of the antenna element 10*l* in the up-down direction. Other structures of the antenna element 10*n* are the same or substantially the same as those of the antenna element 10*l*. The antenna element 10*n* can produce the same or substantially the same advantageous operational effects as those of the antenna element 10*k*.

Furthermore, the first protective layer 70*a* covers the upper main surface (the first main surface) of the insulative substrate 12. This increases an advantageous effect of shortening the wavelength of the radio-frequency signal to be transmitted and received by the antenna conductor layer 20. Furthermore, the antenna conductor layer 20 is protected by the first protective layer 70*a*. Furthermore, filling of the insulative substrate non-forming region A0, the first insulative substrate non-forming regions A1, and the second insulative substrate non-forming regions A2 with the material and forming of the first protective layer 70*a* can be simultaneously performed.

Fifteenth Variant

Figure 25:
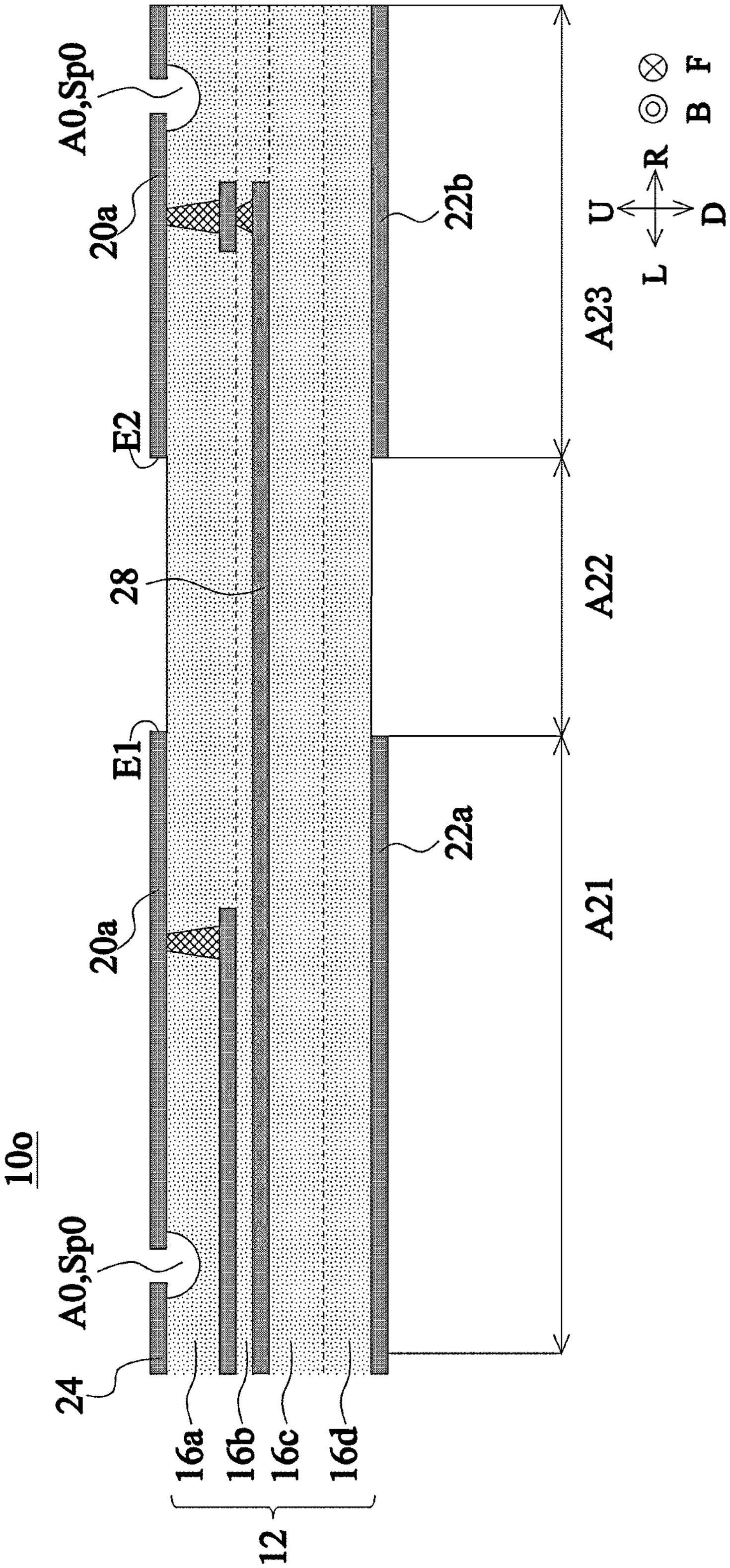
FIG. 25 is a sectional view of an antenna element 10*o* according to a preferred embodiment of the present invention.

Hereinafter, an antenna element 10*o* according to a fifteenth variant of a preferred embodiment of the present invention is described with reference to the drawings. FIG. 25 is a sectional view of the antenna element 10*o*.

The antenna element 10*o* is different from the antenna element 10*d* in that, in the antenna element 10*o*, none of the insulator layers 16*a* to 16*e* in the second section A22 are removed. Since other structures of the antenna element 10*o* are the same or substantially the same as those of the antenna element 10*d*, description thereof is omitted. According to the antenna element 10*o*, the signal conductor layer 28 in the second section A22 is protected by the insulator layers 16*a* to 16*e*. For such an antenna element 10*o*, the second section A22 of the insulative substrate 12 is protected by a dry film so that the second section A22 of the insulative substrate 12 is not subjected to resin etching. The dry film is removed after the resin etching.

Sixteenth Variant

Figure 26:
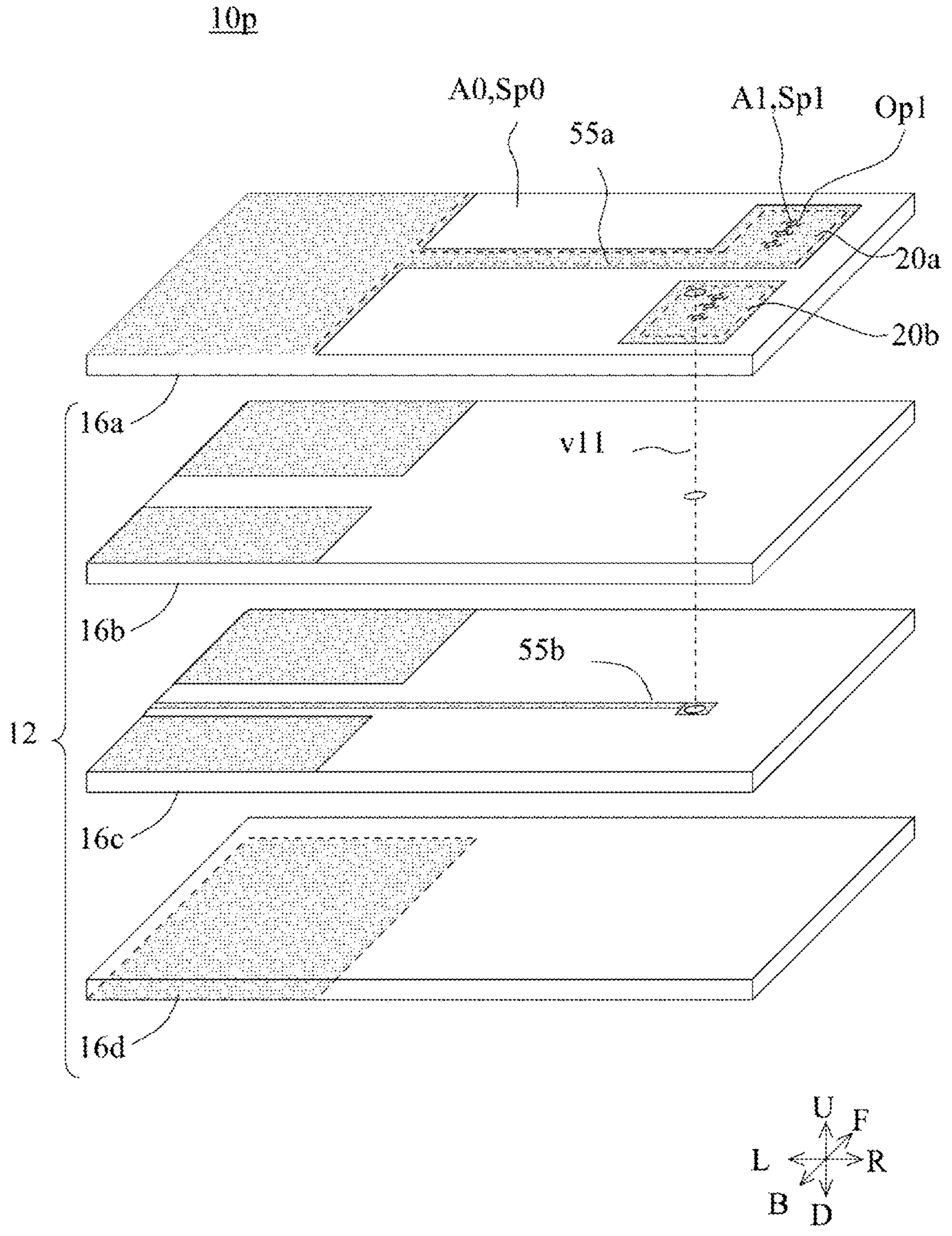
FIG. 26 is an exploded perspective view of an antenna element 10*p* according to a preferred embodiment of the present invention.

Hereinafter, an antenna element 10*p* according to a sixteenth variant of a preferred embodiment of the present invention is described with reference to the drawings. FIG. 26 is an exploded perspective view of the antenna element 10*p*.

The antenna element 10*p* is different from the antenna element 10 in that the antenna conductor layers 20*a* and 20*b* are a dipole antenna. Accordingly, the antenna element 10*p* does not include the reference conductor layer 22. Each of the antenna conductor layers 20*a* and 20*b* is provided on the upper main surface of the insulator layer 16*a*. The antenna conductor layers 20*a* and 20*b* have a strip shape extending in the front-back direction. A signal conductor layer 55*a* is connected to the antenna conductor layer 20*a*. A signal conductor layer 55*b* is connected to the antenna conductor layer 20*b* via an interlayer connection conductor v11.

The plurality of first openings Op1 are provided in each of the antenna conductor layers 20*a* and 20*b*. Furthermore, the plurality of first insulative substrate non-forming regions A1 are provided in the insulator layer 16*a*. Since other structures of the antenna element 10*p* are the same or substantially the same as those of the antenna element 10, description thereof is omitted. The antenna element 10*p* can produce the same or substantially the same advantageous operational effects as those of the antenna element 10.

Circuit Board

Figure 27:
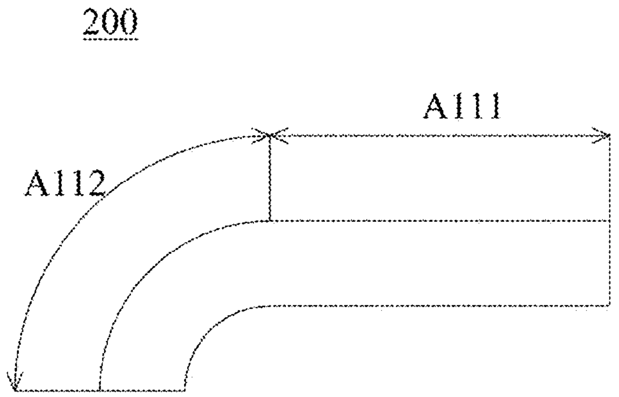
FIG. 27 is a back view of a circuit board 200 according to a preferred embodiment of the present invention.

Hereinafter, a circuit board 200 according to a preferred embodiment of the present invention is described with reference to the drawings. FIG. 27 is a back view of the circuit board 200.

The circuit board 200 includes a first section A111 and a second section A112. The antenna conductor layer 20 is provided in the first section A111. That is, the first section A111 has the same or substantially the same structure as that of the antenna elements 10, 10*a* to 10*h*. The antenna conductor layer 20 is not provided in the second section A112. However, a signal conductor layer electrically connected to the antenna conductor layer 20 is provided. The first section A111 is not curved. The second section A112 is curved. However, the first section A111 may be curved. In this case, the radius of curvature of the first section A111 is greater than the radius of curvature of the second section A112.

Other Variants

Hereinafter, voids Sp0*a* to Sp0*g* of the antenna element according to other variants of preferred embodiments of the present invention are described with reference to the drawings. FIGS. 28 to 34 are respectively sectional views of the voids Sp0*a* to Sp0*g*.

Figure 28:
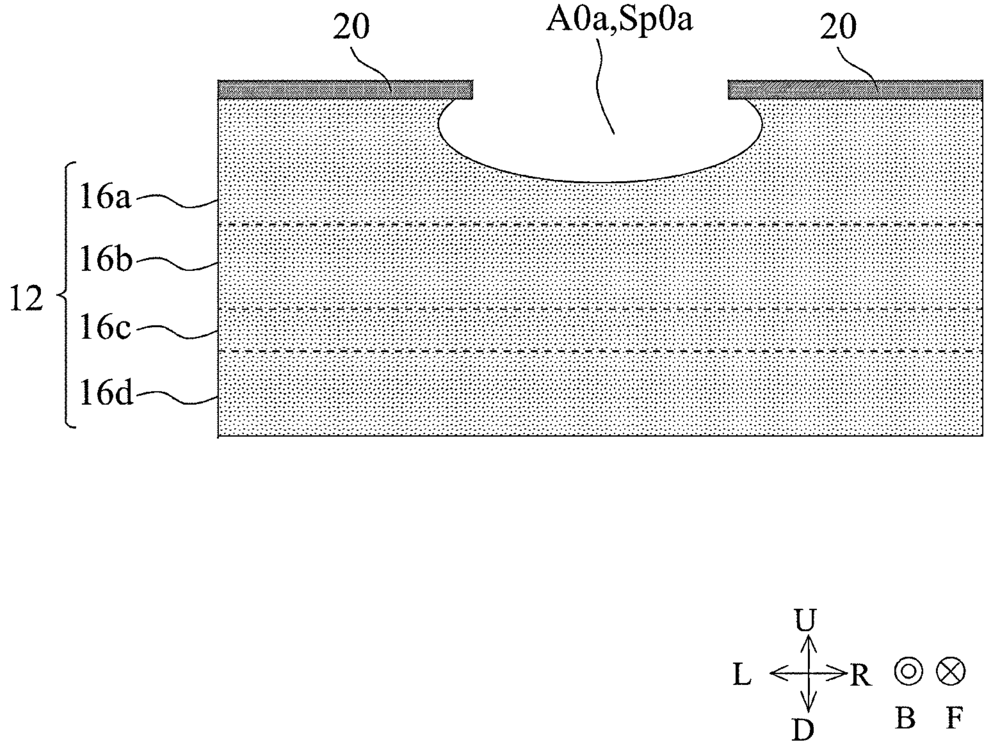
FIG. 28 is a sectional view of a void Sp0*a* according to a preferred embodiment of the present invention.
Figure 29:
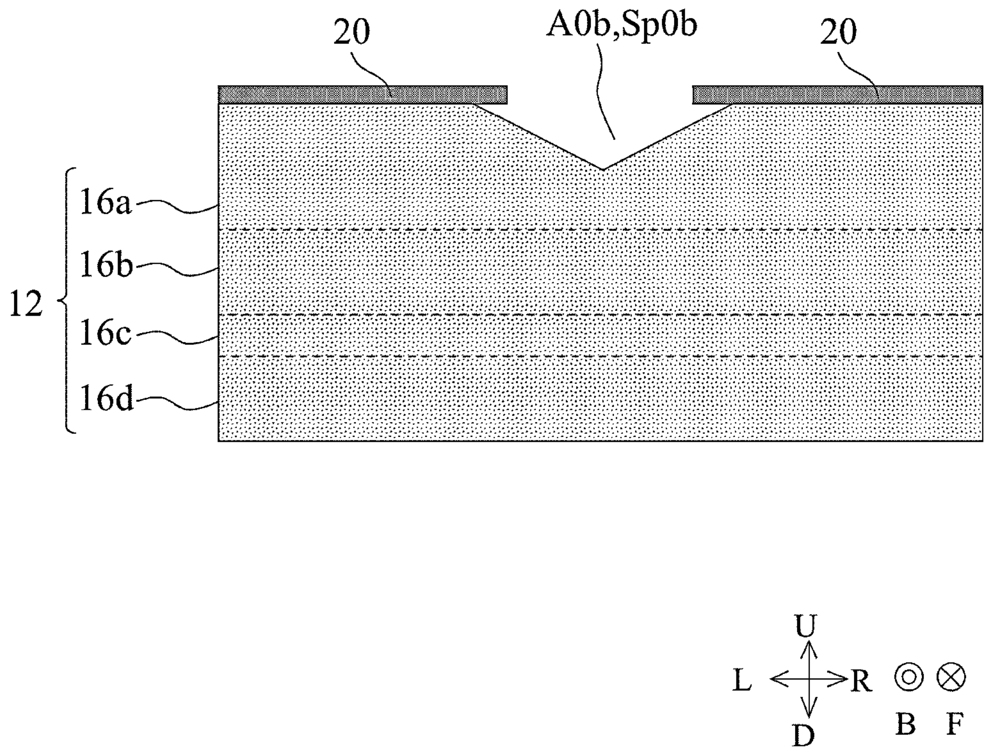
FIG. 29 is a sectional view of a void Sp0*b* according to a preferred embodiment of the present invention.
Figure 30:
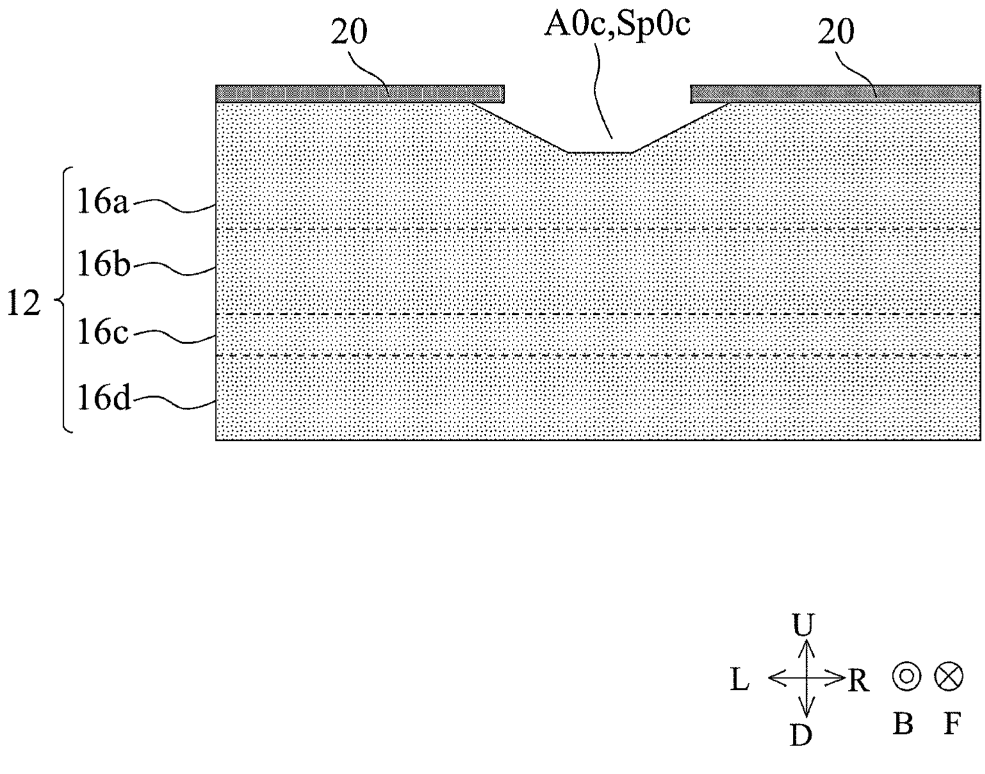
FIG. 30 is a sectional view of a void Sp0*c* according to a preferred embodiment of the present invention.
Figure 31:
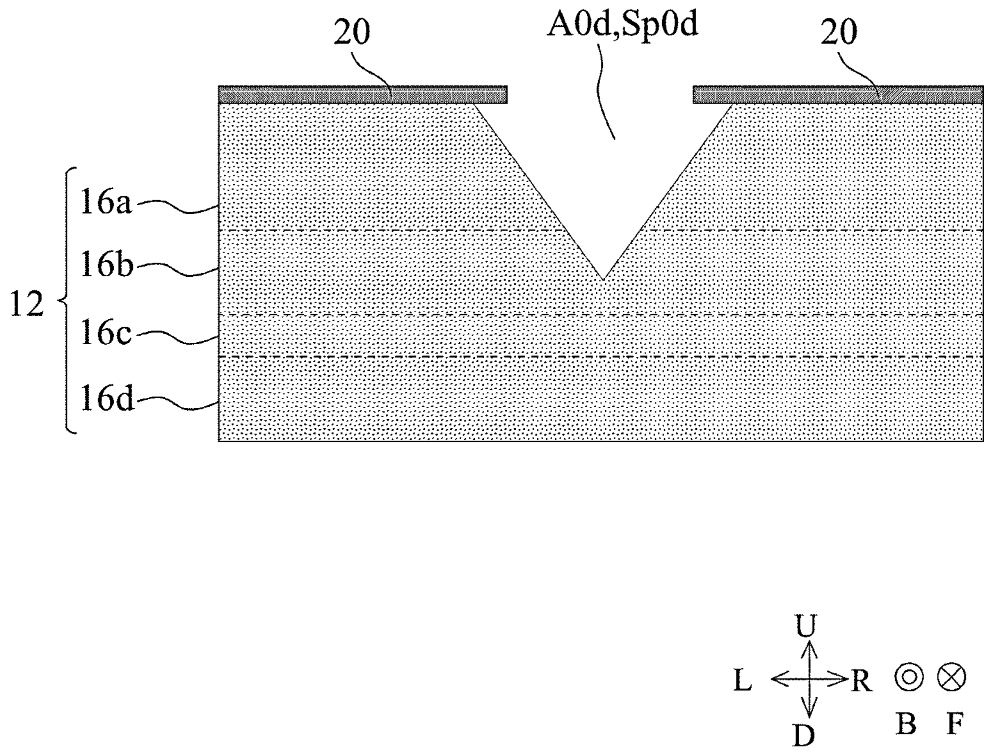
FIG. 31 is a sectional view of a void Sp0*d* according to a preferred embodiment of the present invention.
Figure 32:
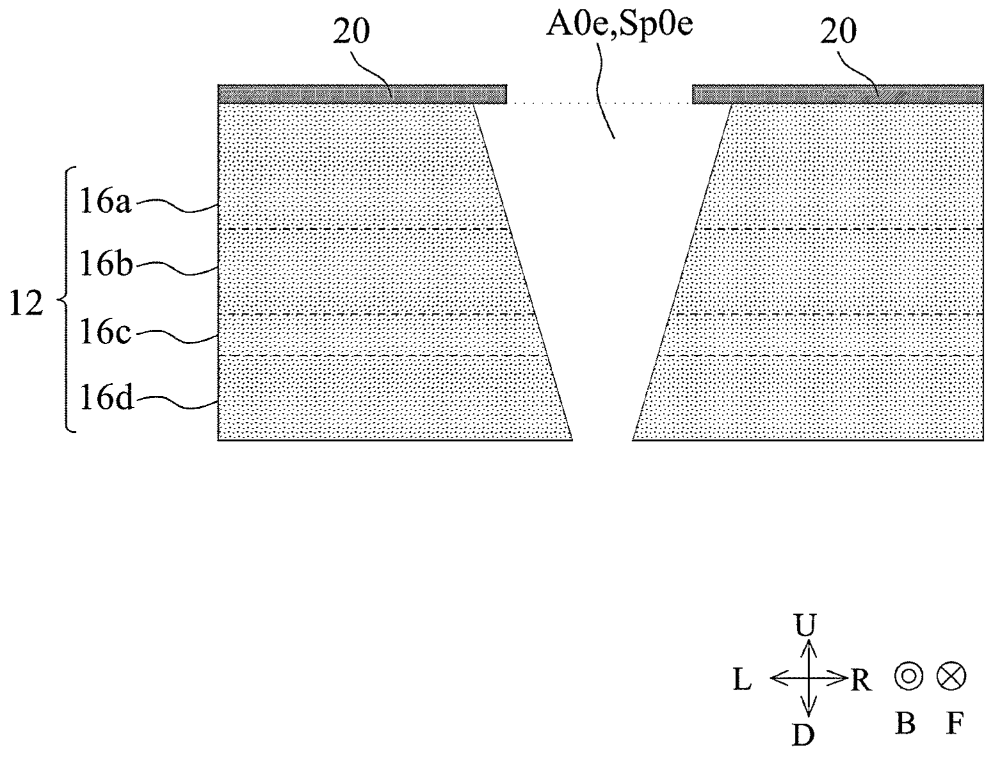
FIG. 32 is a sectional view of a void Sp0*e* according to a preferred embodiment of the present invention.

As illustrated in FIG. 28, a portion of the void Sp0*a* where the width in a direction perpendicular or substantially perpendicular to the up-down direction is maximum may be positioned below the upper main surface of the insulator layer 16*a*. Alternatively, as illustrated in FIG. 29, the void Sp0*b* may have an inverted conical shape. Alternatively, as illustrated in FIG. 30, the void Sp0*c* may have an inverted frusto-conical shape. Alternatively, as illustrated in FIG. 31, the void Sp0*d* may be formed in a plurality of insulator layers 16*a* and 16*b*. Alternatively, as illustrated FIG. 32, the void Sp0*e* may extend through in the up-down direction between the upper main surface of the insulator layer 16*a* and the lower main surface of the insulator layer 16*d*.

Figure 33:
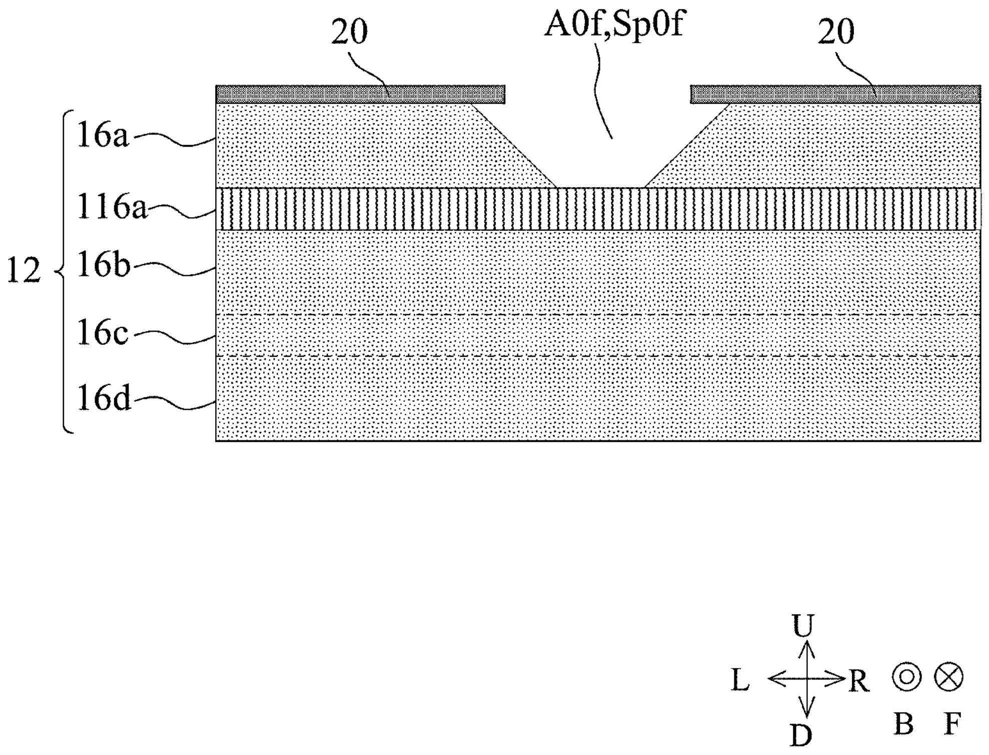
FIG. 33 is a sectional view of a void Sp0*f* according to a preferred embodiment of the present invention.
Figure 34:
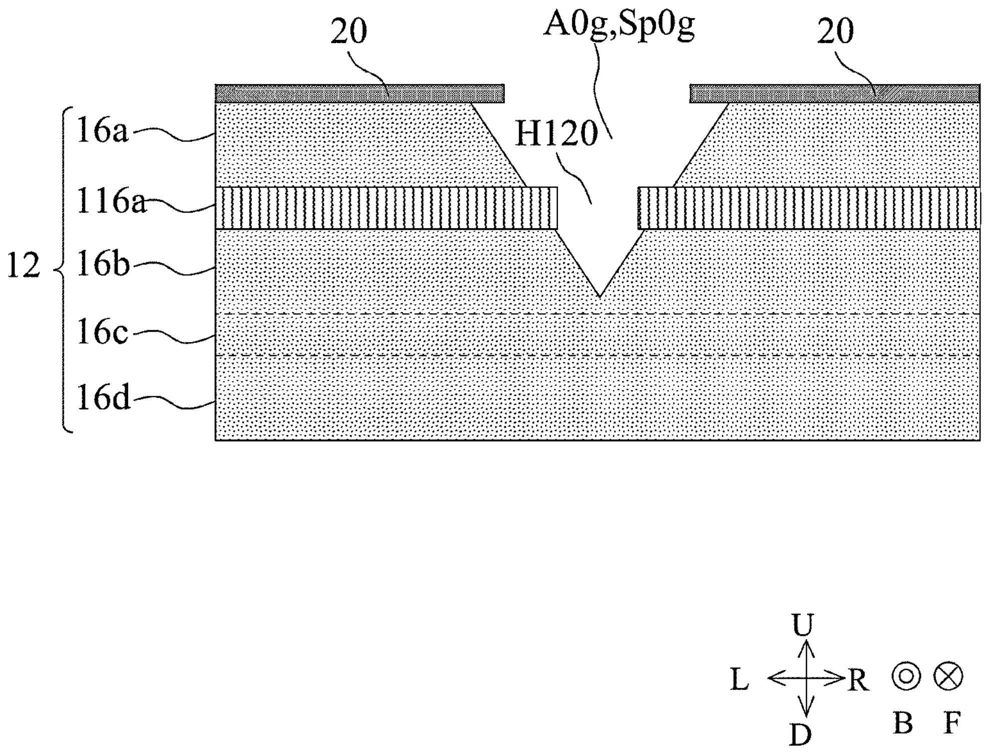
FIG. 34 is a sectional view of a void Sp0*g* according to a preferred embodiment of the present invention.

Alternatively, as illustrated in FIG. 33, an insulator layer 116*a* may be provided between the insulator layer 16*a* and the insulator layer 16*b*. The material of the insulator layer 116*a* is, for example, fluoroplastic. Accordingly, compared to the insulator layer 16*a*, the insulator layer 116*a* is unlikely to be removed by the etching. Accordingly, the void Sp0*f* extends only through the insulator layer 16*a* in the up-down direction. Alternatively, as illustrated in FIG. 34, a through hole H120 may be formed in the insulator layer 116*a*. In this case, the void Sp0*g* is formed in the insulator layer 16*a* and the insulator layer 16*b*. Alternatively, instead of the insulator layer 116*a* illustrated in FIG. 33 or FIG. 34, an electrical conductor layer not to be etched may be provided.

Other Preferred Embodiments

The antenna elements according to preferred embodiments of the present invention are not limited to the antenna elements 10 and 10*a* to 10*p*. The antenna elements according to preferred embodiments of the present invention can be changed without departing from the scope of the present invention. The configurations of the antenna elements 10 and 10*a* to 10*p* may be arbitrarily combined with each other.

The voids Sp0 and Sp0*a* to Sp0*g* may be formed by, for example, resin etching. In this case, processing of the insulator layers 16*a* and 16*e* is facilitated. Alternatively, the voids Sp0 and Sp0*a* to Sp0*g* may be formed by, for example, laser beam radiation. In this case, the insulator layers 16*a* and 16*e* below the conductor layer can be cut by heat. Alternatively, the voids Sp0 and Sp0*a* to Sp0*g* may be formed by, for example, a combination of laser beam radiation and resin etching. In this case, holes having a small diameter and a large depth can be formed.

The reference conductor layer 22, 24, or 26 is not necessarily provided.

In the antenna element 10 and 10*a* to 10*p*, the antenna conductor layer may be a dipole antenna or the like, for example. In this case, the antenna conductor layer has a shape other than a rectangular or substantially rectangular shape such as, for example, a linear shape.

The antenna elements 10*i* to 10*k* may include a plurality of antenna conductor layers.

It is sufficient that at least a portion of the outer boundary E1 of the antenna conductor overlap, when seen in the up-down direction, the insulative substrate non-forming region A0 and is not in contact with the insulative substrate 12. Similarly, it is sufficient that at least a portion of the inner boundary E2 of the reference conductor layer 24 overlap, when seen in the up-down direction, the insulative substrate non-forming region A0 and is not in contact with the insulative substrate 12.

An insulator layer may be further provided above the antenna conductor layer 20. The material of this insulator layer may be the same as the material of the insulator layers 16*a* to 16*e*. However, this insulator layer is not a portion of the insulative substrate 12.

In the antenna elements 10 and 10*a* to 10*p*, the insulative substrate 12 does not necessarily have flexibility. The material of the insulative substrate 12 may be a material other than thermoplastic resin. Alternatively, the insulator layers 16*a* to 16*f* may be joined together with bond layers the material of which is different from the material of the insulator layers 16*a* to 16*f*.

A layer of the same material as the material of the insulator layers 16*a* to 16*d* may be laminated on the upper main surface of the insulative substrate 12. In this case, this layer is not a portion of the insulative substrate 12. That is, the layer laminated above the upper main surface of the insulative substrate 12 where the antenna conductor layer 20 is provided is not a portion of the insulative substrate 12.

In the antenna element 10*l*, the material with which the first insulative substrate non-forming regions A1 and the second insulative substrate non-forming regions A2 are filled may be different from the material of the first protective layer 70*a* and the material of the second protective layer 70*b*.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna element, comprising:

an insulative substrate including a first main surface and a second main surface arranged in an up-down direction; and at least one antenna conductor layer on the first main surface of the insulative substrate; wherein at least one insulative substrate non-forming region is between the insulative substrate and the antenna conductor layer in the up-down direction;

the insulative substrate does not exist in the at least one insulative substrate non-forming region;

all of an outer boundary of the at least one antenna conductor layer overlaps, when seen in the up-down direction, the at least one insulative substrate non-forming region and is not in contact with the insulative substrate;

at least one of the at least one insulative substrate non-forming region is a void, or a low dielectric constant material having a lower dielectric constant than a dielectric constant of the insulative substrate is provided in the at least one insulative substrate non-forming region; and an end of the at least one antenna conductor layer is not in contact with either of the first and second main surfaces of the insulative substrate.

2. The antenna element according to claim 1, further comprising:

a reference conductor layer; wherein the reference conductor layer is provided on the second main surface of the insulative substrate;

when seen in the up-down direction, the outer boundary of the antenna conductor and at least a portion of an inner boundary of the reference conductor layer overlap the at least one insulative substrate non-forming region; and neither of the outer boundary of the antenna conductor nor the at least a portion of the inner boundary of the reference conductor layer is in contact with the insulative substrate.

3. The antenna element according to claim 1, wherein the at least one antenna conductor layer includes a plurality of antenna conductor layers.

4. The antenna element according to claim 1, further comprising:

a first section; and a second section; wherein the second section is bent relative to the first section in the up-down direction in the first section;

a radius of curvature of the second section is smaller than a radius of curvature of the first section; and the at least one insulative substrate non-forming region is positioned in the second section.

5. The antenna element according to claim 1, further comprising a protective layer covering the antenna conductor layer and provided on the first main surface of the insulative substrate.

6. The antenna element according to claim 5, wherein a dielectric constant of the protective layer is greater than the dielectric constant of the insulative substrate.

7. The antenna element according to claim 5, wherein a dielectric constant of the protective layer is smaller than the dielectric constant of the insulative substrate.

8. The antenna element according to claim 5, wherein a through hole is provided in a portion of the protective layer that overlaps the void when seen in the up-down direction.

9. The antenna element according to claim 1, wherein, when seen in the up-down direction, an entirety or substantially an entirety of an outer boundary of the at least one antenna conductor layer overlaps the at least one insulative substrate non-forming region and is not in contact with the insulative substrate.

10. The antenna element according to claim 1, wherein a material of the insulative substrate is thermoplastic resin.

11. An electronic device, comprising:

the antenna element according to claim 1.

12. An antenna element, comprising:

an insulative substrate including a first main surface and a second main surface arranged in an up-down direction;

at least one antenna conductor layer on the first main surface of the insulative substrate; and a reference conductor layer on the first main surface of the insulative substrate; wherein at least one insulative substrate non-forming region is between the insulative substrate and the antenna conductor layer in the up-down direction;

the insulative substrate does not exist in the at least one insulative substrate non-forming region;

when seen in the up-down direction, all of an outer boundary of the at least one antenna conductor layer overlaps the at least one insulative substrate non-forming region and is not in contact with the insulative substrate;

at least one of the at least one of the insulative substrate non-forming region is a void; and the void is adjacent to the at least one antenna conductor layer and the reference conductor layer.

13. The antenna element according to claim 12, further comprising:

another reference conductor layer; wherein the another reference conductor layer is provided on the second main surface of the insulative substrate;

when seen in the up-down direction, the outer boundary of the antenna conductor and at least a portion of an inner boundary of the another reference conductor layer overlap the at least one insulative substrate non-forming region; and neither of the outer boundary of the antenna conductor nor the at least a portion of the inner boundary of the reference conductor layer is in contact with the insulative substrate.

14. The antenna element according to claim 12, wherein the at least one antenna conductor layer includes a plurality of antenna conductor layers.

15. The antenna element according to claim 12, further comprising:

a first section; and a second section; wherein the second section is bent relative to the first section in the up-down direction in the first section;

a radius of curvature of the second section is smaller than a radius of curvature of the first section; and the at least one insulative substrate non-forming region is positioned in the second section.

16. The antenna element according to claim 12, further comprising a protective layer covering the antenna conductor layer and provided on the first main surface of the insulative substrate.

17. The antenna element according to claim 16, wherein a dielectric constant of the protective layer is greater than the dielectric constant of the insulative substrate.

18. The antenna element according to claim 16, wherein a dielectric constant of the protective layer is smaller than the dielectric constant of the insulative substrate.

19. The antenna element according to claim 16, wherein a through hole is provided in a portion of the protective layer that overlaps the void when seen in the up-down direction.

20. The antenna element according to claim 12, wherein, when seen in the up-down direction, an entirety or substantially an entirety of an outer boundary of the at least one antenna conductor layer overlaps the at least one insulative substrate non-forming region and is not in contact with the insulative substrate.

21. The antenna element according to claim 12, wherein a material of the insulative substrate is thermoplastic resin.

22. An electronic device, comprising:

the antenna element according to claim 12.

* * * * *